US009946383B2

(12) United States Patent
Cady et al.

(10) Patent No.: US 9,946,383 B2
(45) Date of Patent: *Apr. 17, 2018

(54) CONDUCTIVE TRACE ROUTING FOR DISPLAY AND BEZEL SENSORS

(71) Applicant: Microsoft Technology Licensing, LLC, Redmond, WA (US)

(72) Inventors: Andrew N. Cady, Kirkland, WA (US); Christopher A. Whitman, Fort Collins, CO (US); Steven Nabil Bathiche, Kirkland, WA (US); Thomas Charles Oliver, Windsor, CO (US); Rajesh Manohar Dighde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,758

(22) Filed: Apr. 29, 2016

(65) Prior Publication Data

US 2016/0291787 A1   Oct. 6, 2016

Related U.S. Application Data

(63) Continuation of application No. 14/212,916, filed on Mar. 14, 2014, now Pat. No. 9,477,337.

(51) Int. Cl.
  *G06F 3/041* (2006.01)
  *G06F 3/0488* (2013.01)

(52) U.S. Cl.
  CPC .......... *G06F 3/0412* (2013.01); *G06F 3/0416* (2013.01); *G06F 3/0488* (2013.01);
  (Continued)

(58) Field of Classification Search
  CPC ...... G06F 3/041; G06F 3/0412; G06F 3/0416; G06F 3/0488; G06F 3/04883;
  (Continued)

(56) References Cited

U.S. PATENT DOCUMENTS

| 4,686,332 A | 8/1987 | Greanias et al. |
| 4,843,538 A | 6/1989 | Lane et al. |

(Continued)

FOREIGN PATENT DOCUMENTS

| CN | 1326564 | 12/2001 |
| CN | 1578430 | 2/2005 |

(Continued)

OTHER PUBLICATIONS

"Search Report", TW Application No. 099142890, dated Jun. 30, 2015, 1 page.

(Continued)

*Primary Examiner* — Tom Sheng

(57) ABSTRACT

Conductive trace routing techniques for display and bezel sensors are described. In one or more implementations, an apparatus includes display sensors, bezel sensors, and a plurality of conductive traces. The display sensors are configured to detect proximity of an object and are arranged in conjunction with a display area of a display device to support interaction with a user interface displayed by the display device. The bezel sensors are configured to detect proximity of an object and are disposed in a bezel that at least partially surrounds the display device and is outside the display area. The plurality of conductive traces are disposed between the display and bezel sensors and communicatively couple the display sensors and the bezel sensors to one or more computing components that are configured to process inputs received from the display sensors and the bezel sensors.

20 Claims, 7 Drawing Sheets

(52) U.S. Cl.
CPC ............... *G06F 3/04883* (2013.01); *G06F 2203/04103* (2013.01); *G06F 2203/04106* (2013.01)

(58) Field of Classification Search
CPC ......... G06F 1/3262; G06F 2203/04101; G06F 2203/04103; G06F 2203/04106; G06F 2203/04108
See application file for complete search history.

(56) References Cited

U.S. PATENT DOCUMENTS

| | | | |
|---|---|---|---|
| 4,868,912 A | 9/1989 | Doering | |
| 5,231,578 A | 7/1993 | Levin et al. | |
| 5,237,647 A | 8/1993 | Roberts et al. | |
| 5,252,951 A | 10/1993 | Tannenbaum et al. | |
| 5,351,995 A | 10/1994 | Booker et al. | |
| 5,404,458 A | 4/1995 | Zetts | |
| 5,463,725 A | 10/1995 | Henckel et al. | |
| 5,491,783 A | 2/1996 | Douglas et al. | |
| 5,496,974 A | 3/1996 | Akebi et al. | |
| 5,497,776 A | 3/1996 | Yamazaki et al. | |
| 5,511,148 A | 4/1996 | Wellner | |
| 5,555,369 A | 9/1996 | Menendez et al. | |
| 5,596,697 A | 1/1997 | Foster et al. | |
| 5,661,773 A | 8/1997 | Swerdloff et al. | |
| 5,664,128 A | 9/1997 | Bauer | |
| 5,664,133 A | 9/1997 | Malamud et al. | |
| 5,694,150 A | 12/1997 | Sigona et al. | |
| 5,731,813 A | 3/1998 | O'Rourke et al. | |
| 5,761,485 A | 6/1998 | Munyan | |
| 5,777,596 A | 7/1998 | Herbert | |
| 5,817,019 A | 10/1998 | Kawashima | |
| 5,821,930 A | 10/1998 | Hansen | |
| 5,838,889 A | 11/1998 | Booker et al. | |
| 5,898,434 A | 4/1999 | Small et al. | |
| 5,943,052 A | 8/1999 | Allen | |
| 5,969,720 A | 10/1999 | Lisle et al. | |
| 6,029,214 A | 2/2000 | Dorfman et al. | |
| 6,037,937 A | 3/2000 | Beaton et al. | |
| 6,061,061 A | 5/2000 | Conrad et al. | |
| 6,072,476 A | 6/2000 | Harada et al. | |
| 6,097,392 A | 8/2000 | Leyerle | |
| 6,115,724 A | 9/2000 | Booker et al. | |
| 6,167,439 A | 12/2000 | Levine et al. | |
| 6,208,331 B1 | 3/2001 | Singh | |
| 6,239,798 B1 | 5/2001 | Ludolph et al. | |
| 6,246,395 B1 | 6/2001 | Goyins | |
| 6,266,050 B1 | 7/2001 | Oh et al. | |
| 6,278,443 B1 | 8/2001 | Amro et al. | |
| 6,310,610 B1 | 10/2001 | Beaton et al. | |
| 6,340,979 B1 | 1/2002 | Beaton et al. | |
| 6,396,523 B1 | 5/2002 | Segal et al. | |
| 6,459,424 B1 | 10/2002 | Resman | |
| 6,507,352 B1 | 1/2003 | Cohen et al. | |
| 6,525,749 B1 | 2/2003 | Moran et al. | |
| 6,545,669 B1 | 4/2003 | Kinawi et al. | |
| 6,831,631 B2 | 12/2004 | Chuang | |
| 6,859,909 B1 | 2/2005 | Lerner et al. | |
| 6,920,619 B1 | 7/2005 | Milekic | |
| 6,957,233 B1 | 10/2005 | Beezer et al. | |
| 7,023,427 B2 | 4/2006 | Kraus et al. | |
| 7,053,887 B2 | 5/2006 | Kraus et al. | |
| 7,209,125 B2 | 4/2007 | Kong et al. | |
| 7,295,191 B2 | 11/2007 | Kraus et al. | |
| 7,302,650 B1 | 11/2007 | Allyn et al. | |
| 7,338,224 B2 | 3/2008 | Jones et al. | |
| 7,339,580 B2 | 3/2008 | Westerman et al. | |
| 7,454,717 B2 | 11/2008 | Hinckley et al. | |
| 7,479,949 B2 | 1/2009 | Jobs et al. | |
| 7,506,269 B2 | 3/2009 | Lang | |
| 7,532,196 B2 | 5/2009 | Hinckley | |
| 7,561,146 B1 | 7/2009 | Hotelling | |
| 7,605,804 B2 | 10/2009 | Wilson | |
| 7,636,071 B2 | 12/2009 | O'Gorman | |
| 7,643,012 B2 | 1/2010 | Kim et al. | |
| 7,656,393 B2 | 2/2010 | King et al. | |
| 7,676,767 B2 | 3/2010 | Hofmeister et al. | |
| 7,760,187 B2 | 7/2010 | Kennedy | |
| 7,821,780 B2 | 10/2010 | Choy | |
| 7,847,789 B2 | 12/2010 | Kolmykov-Zotov et al. | |
| D631,043 S | 1/2011 | Kell | |
| 7,898,529 B2 | 3/2011 | Fitzmaurice et al. | |
| 7,956,847 B2 | 6/2011 | Christie | |
| 8,018,440 B2 | 9/2011 | Townsend et al. | |
| 8,102,858 B1 | 1/2012 | Rahim et al. | |
| 8,122,384 B2 | 2/2012 | Partridge et al. | |
| 8,169,418 B2 | 5/2012 | Birkler | |
| 8,181,122 B2 | 5/2012 | Davidson | |
| 8,212,788 B2 | 7/2012 | Lam | |
| 8,239,785 B2 | 8/2012 | Hinckley | |
| 8,261,213 B2 | 9/2012 | Hinckley | |
| 8,274,482 B2 | 9/2012 | Kim et al. | |
| 8,284,170 B2 | 10/2012 | Bernstein | |
| 8,289,289 B2 | 10/2012 | Rimon et al. | |
| 8,294,669 B2 | 10/2012 | Partridge et al. | |
| 8,294,686 B2 | 10/2012 | Townsend et al. | |
| 8,327,295 B2 | 12/2012 | Ikeda et al. | |
| 8,335,996 B2 | 12/2012 | Davidson et al. | |
| 8,345,008 B2 | 1/2013 | Lee et al. | |
| 8,373,660 B2 | 2/2013 | Pallakoff | |
| 8,395,600 B2 | 3/2013 | Kawashima et al. | |
| 8,407,606 B1 | 3/2013 | Davidson et al. | |
| 8,473,870 B2 | 6/2013 | Hinckley et al. | |
| 8,477,114 B2 | 7/2013 | Miller et al. | |
| 8,539,384 B2 | 9/2013 | Hinckley et al. | |
| 8,581,864 B2 | 11/2013 | Miyazawa et al. | |
| 8,587,526 B2 | 11/2013 | Engelhardt et al. | |
| 8,640,047 B2 | 1/2014 | Mouton et al. | |
| 8,643,628 B1 * | 2/2014 | Eriksson | G06F 1/169 345/173 |
| 8,659,570 B2 | 2/2014 | Townsend et al. | |
| 8,707,174 B2 | 4/2014 | Hinckley et al. | |
| 8,751,970 B2 | 6/2014 | Hinckley et al. | |
| 8,788,967 B2 | 7/2014 | Davidson et al. | |
| 8,799,827 B2 | 8/2014 | Hinckley et al. | |
| 8,810,533 B2 | 8/2014 | Chen | |
| 8,836,648 B2 | 9/2014 | Wilairat | |
| 8,836,659 B2 * | 9/2014 | Chen | G06F 3/0482 345/173 |
| 9,047,009 B2 | 6/2015 | King | |
| 9,075,522 B2 | 7/2015 | Hinckley et al. | |
| 9,256,342 B2 | 2/2016 | Davidson | |
| 9,261,964 B2 | 2/2016 | Townsend et al. | |
| 9,274,682 B2 | 3/2016 | Hinckley et al. | |
| 9,310,994 B2 | 4/2016 | Hinckley et al. | |
| 9,360,972 B1 * | 6/2016 | Avery | G06F 3/044 |
| 9,367,205 B2 | 6/2016 | Hinckley et al. | |
| 9,477,337 B2 * | 10/2016 | Cady | G06F 3/0412 |
| 9,519,419 B2 | 12/2016 | Hinckley et al. | |
| 9,582,122 B2 | 2/2017 | Bathiche | |
| 9,594,457 B2 | 3/2017 | Townsend et al. | |
| 2001/0012000 A1 | 8/2001 | Eberhard | |
| 2001/0035860 A1 | 11/2001 | Segal et al. | |
| 2001/0047263 A1 | 11/2001 | Smith et al. | |
| 2002/0060701 A1 | 5/2002 | Naughton et al. | |
| 2002/0097229 A1 | 7/2002 | Rose et al. | |
| 2002/0101457 A1 | 8/2002 | Lang | |
| 2002/0116421 A1 | 8/2002 | Fox et al. | |
| 2003/0016253 A1 | 1/2003 | Aoki et al. | |
| 2003/0063073 A1 | 4/2003 | Geaghan et al. | |
| 2003/0067451 A1 | 4/2003 | Tagg et al. | |
| 2003/0095095 A1 | 5/2003 | Pihlaja | |
| 2003/0098858 A1 | 5/2003 | Perski et al. | |
| 2003/0142081 A1 | 7/2003 | Iizuka | |
| 2003/0179541 A1 | 9/2003 | Sullivan | |
| 2003/0231219 A1 | 12/2003 | Leung | |
| 2004/0001048 A1 | 1/2004 | Kraus et al. | |
| 2004/0012572 A1 | 1/2004 | Sowden et al. | |
| 2004/0155871 A1 | 8/2004 | Perski et al. | |
| 2004/0236741 A1 | 11/2004 | Burstrom et al. | |
| 2004/0236774 A1 | 11/2004 | Baird et al. | |
| 2004/0255254 A1 | 12/2004 | Weingart et al. | |
| 2005/0012723 A1 | 1/2005 | Pallakoff | |

(56) References Cited

U.S. PATENT DOCUMENTS

| | | |
|---|---|---|
| 2005/0017957 A1 | 1/2005 | Yi |
| 2005/0017959 A1 | 1/2005 | Kraus et al. |
| 2005/0052432 A1 | 3/2005 | Kraus et al. |
| 2005/0076300 A1 | 4/2005 | Martinez |
| 2005/0101864 A1 | 5/2005 | Zheng et al. |
| 2005/0129314 A1 | 6/2005 | Chen |
| 2005/0162402 A1 | 7/2005 | Watanachote |
| 2005/0177796 A1 | 8/2005 | Takahashi |
| 2005/0184973 A1 | 8/2005 | Lum et al. |
| 2005/0189154 A1 | 9/2005 | Perski et al. |
| 2005/0198592 A1 | 9/2005 | Keely, Jr. et al. |
| 2006/0001650 A1 | 1/2006 | Robbins et al. |
| 2006/0010371 A1 | 1/2006 | Shur et al. |
| 2006/0012580 A1 | 1/2006 | Perski et al. |
| 2006/0012581 A1 | 1/2006 | Haim et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0071912 A1 | 4/2006 | Hill |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0109252 A1 | 5/2006 | Kolmykov-Zotov et al. |
| 2006/0112335 A1 | 5/2006 | Hofmeister et al. |
| 2006/0161870 A1 | 7/2006 | Hotelling et al. |
| 2006/0197750 A1 | 9/2006 | Kerr et al. |
| 2006/0197753 A1 | 9/2006 | Hotelling |
| 2006/0197963 A1 | 9/2006 | Royal et al. |
| 2006/0238517 A1 | 10/2006 | King et al. |
| 2006/0238520 A1 | 10/2006 | Westerman et al. |
| 2006/0262105 A1 | 11/2006 | Smith et al. |
| 2006/0262188 A1 | 11/2006 | Elyada et al. |
| 2006/0267955 A1 | 11/2006 | Hino |
| 2006/0279548 A1 | 12/2006 | Geaghan |
| 2006/0284852 A1 | 12/2006 | Hofmeister et al. |
| 2007/0043744 A1 | 2/2007 | Carro |
| 2007/0063987 A1 | 3/2007 | Sato et al. |
| 2007/0075976 A1 | 4/2007 | Kun et al. |
| 2007/0097096 A1 | 5/2007 | Rosenberg |
| 2007/0106939 A1 | 5/2007 | Qassoudi |
| 2007/0109274 A1 | 5/2007 | Reynolds |
| 2007/0120762 A1 | 5/2007 | O'Gorman |
| 2007/0146337 A1 | 6/2007 | Ording et al. |
| 2007/0146347 A1 | 6/2007 | Rosenberg |
| 2007/0150496 A1 | 6/2007 | Feinsmith |
| 2007/0152976 A1 | 7/2007 | Townsend et al. |
| 2007/0168890 A1 | 7/2007 | Zhao et al. |
| 2007/0171211 A1 | 7/2007 | Perski et al. |
| 2007/0236468 A1 | 10/2007 | Tuli |
| 2007/0242056 A1 | 10/2007 | Engelhardt et al. |
| 2007/0262951 A1 | 11/2007 | Huie et al. |
| 2008/0001924 A1 | 1/2008 | de los Reyes et al. |
| 2008/0005703 A1 | 1/2008 | Radivojevic et al. |
| 2008/0036743 A1 | 2/2008 | Westerman et al. |
| 2008/0040692 A1 | 2/2008 | Sunday et al. |
| 2008/0042978 A1 | 2/2008 | Perez-Noguera |
| 2008/0046425 A1 | 2/2008 | Perski |
| 2008/0052945 A1 | 3/2008 | Matas et al. |
| 2008/0059914 A1 | 3/2008 | Allyn et al. |
| 2008/0062141 A1 | 3/2008 | Chandhri |
| 2008/0065720 A1 | 3/2008 | Brodersen et al. |
| 2008/0074402 A1 | 3/2008 | Cornish et al. |
| 2008/0082903 A1 | 4/2008 | McCurdy et al. |
| 2008/0084400 A1 | 4/2008 | Rosenberg |
| 2008/0164982 A1 | 7/2008 | Andrews et al. |
| 2008/0165141 A1 | 7/2008 | Christie |
| 2008/0165255 A1 | 7/2008 | Christie et al. |
| 2008/0168382 A1 | 7/2008 | Louch et al. |
| 2008/0168396 A1 | 7/2008 | Matas et al. |
| 2008/0168403 A1 | 7/2008 | Westerman et al. |
| 2008/0180404 A1 | 7/2008 | Han et al. |
| 2008/0211766 A1 | 9/2008 | Westerman et al. |
| 2008/0211778 A1 | 9/2008 | Ording et al. |
| 2008/0218494 A1 | 9/2008 | Perski et al. |
| 2008/0229192 A1 | 9/2008 | Gear et al. |
| 2008/0249682 A1 | 10/2008 | Wisniewski et al. |
| 2008/0278455 A1 | 11/2008 | Atkins et al. |
| 2008/0303798 A1 | 12/2008 | Matsudate et al. |
| 2009/0019188 A1 | 1/2009 | Mattice et al. |
| 2009/0033632 A1 | 2/2009 | Szolyga et al. |
| 2009/0054107 A1 | 2/2009 | Feland, III et al. |
| 2009/0058830 A1 | 3/2009 | Herz |
| 2009/0059730 A1 | 3/2009 | Lyons et al. |
| 2009/0064012 A1 | 3/2009 | Tremblay |
| 2009/0074255 A1 | 3/2009 | Holm |
| 2009/0077501 A1 | 3/2009 | Partridge et al. |
| 2009/0079699 A1 | 3/2009 | Sun |
| 2009/0094562 A1 | 4/2009 | Jeong et al. |
| 2009/0096758 A1 | 4/2009 | Hotelling et al. |
| 2009/0117943 A1 | 5/2009 | Lee et al. |
| 2009/0128505 A1 | 5/2009 | Partridge et al. |
| 2009/0138830 A1 | 5/2009 | Borgaonkar et al. |
| 2009/0143141 A1 | 6/2009 | Wells et al. |
| 2009/0153289 A1 | 6/2009 | Hope et al. |
| 2009/0153438 A1 | 6/2009 | Miller et al. |
| 2009/0167696 A1 | 7/2009 | Griffin |
| 2009/0167702 A1 | 7/2009 | Nurmi |
| 2009/0174679 A1 | 7/2009 | Westerman |
| 2009/0184921 A1 | 7/2009 | Scott et al. |
| 2009/0193366 A1 | 7/2009 | Davidson |
| 2009/0217211 A1 | 8/2009 | Hildreth et al. |
| 2009/0249236 A1 | 10/2009 | Westerman et al. |
| 2009/0249247 A1 | 10/2009 | Tseng et al. |
| 2009/0251432 A1 | 10/2009 | Wang et al. |
| 2009/0251434 A1 | 10/2009 | Rimon et al. |
| 2009/0256857 A1 | 10/2009 | Davidson et al. |
| 2009/0276701 A1 | 11/2009 | Nurmi |
| 2009/0278806 A1 | 11/2009 | Duarte et al. |
| 2009/0282332 A1 | 11/2009 | Porat |
| 2009/0284478 A1 | 11/2009 | De la Torre Baltierra et al. |
| 2009/0284488 A1 | 11/2009 | Sip |
| 2009/0295753 A1 | 12/2009 | King et al. |
| 2009/0307589 A1 | 12/2009 | Inose et al. |
| 2009/0309846 A1 | 12/2009 | Trachtenberg et al. |
| 2009/0320070 A1 | 12/2009 | Inoguchi |
| 2009/0327963 A1 | 12/2009 | Mouilleseaux et al. |
| 2009/0327975 A1 | 12/2009 | Stedman |
| 2010/0013768 A1 | 1/2010 | Leung |
| 2010/0013792 A1 | 1/2010 | Fukushima |
| 2010/0016049 A1 | 1/2010 | Shirakawa et al. |
| 2010/0020025 A1 | 1/2010 | Lemort et al. |
| 2010/0039392 A1 | 2/2010 | Pratt et al. |
| 2010/0042827 A1 | 2/2010 | Pratt et al. |
| 2010/0045705 A1 | 2/2010 | Vertegaal et al. |
| 2010/0050076 A1 | 2/2010 | Roth |
| 2010/0051355 A1* | 3/2010 | Yang .................. G06F 3/044 178/18.06 |
| 2010/0053103 A1* | 3/2010 | No .................. G06F 3/044 345/173 |
| 2010/0053861 A1* | 3/2010 | Kim .................. H04M 1/236 361/679.01 |
| 2010/0058182 A1 | 3/2010 | Jung |
| 2010/0060607 A1 | 3/2010 | Ludwig |
| 2010/0066667 A1 | 3/2010 | MacDougall et al. |
| 2010/0066694 A1 | 3/2010 | Jonsdottir |
| 2010/0066698 A1 | 3/2010 | Seo |
| 2010/0079392 A1 | 4/2010 | Chiang et al. |
| 2010/0081475 A1 | 4/2010 | Chiang et al. |
| 2010/0083154 A1 | 4/2010 | Takeshita |
| 2010/0083190 A1 | 4/2010 | Roberts et al. |
| 2010/0088641 A1 | 4/2010 | Choi |
| 2010/0090971 A1 | 4/2010 | Choi et al. |
| 2010/0097338 A1 | 4/2010 | Miyashita et al. |
| 2010/0103136 A1 | 4/2010 | Ono et al. |
| 2010/0105443 A1 | 4/2010 | Vaisanen |
| 2010/0107067 A1 | 4/2010 | Vaisanen |
| 2010/0110019 A1* | 5/2010 | Ozias .................. G06F 3/03547 345/173 |
| 2010/0115455 A1 | 5/2010 | Kim |
| 2010/0123675 A1* | 5/2010 | Ippel .................. G06F 3/044 345/173 |
| 2010/0134415 A1 | 6/2010 | Iwase et al. |

(56) References Cited

U.S. PATENT DOCUMENTS

| | | |
|---|---|---|
| 2010/0134423 A1 | 6/2010 | Brisebois et al. |
| 2010/0134424 A1 | 6/2010 | Brisebois et al. |
| 2010/0137027 A1 | 6/2010 | Kim |
| 2010/0149109 A1 | 6/2010 | Elias |
| 2010/0164878 A1 | 7/2010 | Bestle et al. |
| 2010/0164897 A1 | 7/2010 | Morin et al. |
| 2010/0164959 A1 | 7/2010 | Brown et al. |
| 2010/0169813 A1 | 7/2010 | Chang |
| 2010/0182247 A1 | 7/2010 | Petschnigg et al. |
| 2010/0182264 A1 | 7/2010 | Hahn et al. |
| 2010/0188371 A1 | 7/2010 | Lowles et al. |
| 2010/0201634 A1 | 8/2010 | Coddington |
| 2010/0213040 A1 | 8/2010 | Yeh et al. |
| 2010/0217428 A1 | 8/2010 | Strong et al. |
| 2010/0220900 A1 | 9/2010 | Orsley |
| 2010/0241973 A1 | 9/2010 | Whiddett |
| 2010/0245242 A1 | 9/2010 | Wu et al. |
| 2010/0245263 A1 | 9/2010 | Parada, Jr. et al. |
| 2010/0251112 A1 | 9/2010 | Hinckley et al. |
| 2010/0251189 A1 | 9/2010 | Jaeger |
| 2010/0262928 A1 | 10/2010 | Abbott |
| 2010/0283748 A1 | 11/2010 | Hsieh et al. |
| 2010/0295795 A1 | 11/2010 | Wilairat |
| 2010/0302172 A1 | 12/2010 | Wilairat |
| 2010/0302712 A1 | 12/2010 | Zednicek et al. |
| 2010/0306702 A1 | 12/2010 | Warner |
| 2010/0313124 A1 | 12/2010 | Privault et al. |
| 2010/0321326 A1 | 12/2010 | Grunthaner et al. |
| 2011/0012841 A1* | 1/2011 | Lin .............. G06F 3/041 345/173 |
| 2011/0018821 A1 | 1/2011 | Kii |
| 2011/0041096 A1 | 2/2011 | Larco et al. |
| 2011/0043472 A1 | 2/2011 | Hada |
| 2011/0043475 A1 | 2/2011 | Rigazio et al. |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0072036 A1 | 3/2011 | Agsen et al. |
| 2011/0107220 A1 | 5/2011 | Perlman |
| 2011/0115735 A1 | 5/2011 | Lev et al. |
| 2011/0115784 A1 | 5/2011 | Tartz et al. |
| 2011/0117526 A1 | 5/2011 | Wigdor et al. |
| 2011/0126094 A1 | 5/2011 | Horodezky et al. |
| 2011/0143769 A1 | 6/2011 | Jones et al. |
| 2011/0159915 A1 | 6/2011 | Yano et al. |
| 2011/0167092 A1 | 7/2011 | Subramaniam et al. |
| 2011/0167336 A1 | 7/2011 | Aitken et al. |
| 2011/0167350 A1 | 7/2011 | Hoellwarth |
| 2011/0167391 A1 | 7/2011 | Momeyer et al. |
| 2011/0169749 A1 | 7/2011 | Ganey et al. |
| 2011/0181524 A1 | 7/2011 | Hinckley et al. |
| 2011/0185299 A1 | 7/2011 | Hinckley |
| 2011/0185300 A1 | 7/2011 | Hinckley |
| 2011/0185318 A1 | 7/2011 | Hinckley et al. |
| 2011/0185320 A1 | 7/2011 | Hinckley |
| 2011/0187647 A1 | 8/2011 | Woloszynski et al. |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0205163 A1 | 8/2011 | Hinckley |
| 2011/0209039 A1 | 8/2011 | Hinckley et al. |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley et al. |
| 2011/0209093 A1 | 8/2011 | Hinckley |
| 2011/0209097 A1 | 8/2011 | Hinckley |
| 2011/0209098 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley |
| 2011/0209104 A1 | 8/2011 | Hinckley et al. |
| 2011/0231796 A1 | 9/2011 | Vigil |
| 2011/0242039 A1 | 10/2011 | Kalis et al. |
| 2011/0242138 A1 | 10/2011 | Tribble |
| 2011/0261058 A1 | 10/2011 | Luo |
| 2011/0291948 A1 | 12/2011 | Stewart et al. |
| 2011/0291964 A1 | 12/2011 | Chambers et al. |
| 2011/0310459 A1* | 12/2011 | Gates .............. G06F 3/0412 359/296 |
| 2012/0001861 A1 | 1/2012 | Townsend et al. |
| 2012/0032979 A1 | 2/2012 | Blow et al. |
| 2012/0075194 A1 | 3/2012 | Ferren |
| 2012/0084705 A1 | 4/2012 | Lee et al. |
| 2012/0096411 A1 | 4/2012 | Nash |
| 2012/0113007 A1 | 5/2012 | Koch et al. |
| 2012/0131454 A1 | 5/2012 | Shah |
| 2012/0154303 A1 | 6/2012 | Lazaridis et al. |
| 2012/0158629 A1 | 6/2012 | Hinckley et al. |
| 2012/0212445 A1* | 8/2012 | Heikkinen .............. G06F 1/1626 345/174 |
| 2012/0236026 A1 | 9/2012 | Hinckley |
| 2012/0262407 A1 | 10/2012 | Hinckley et al. |
| 2012/0287076 A1 | 11/2012 | Dao et al. |
| 2012/0304133 A1 | 11/2012 | Nan et al. |
| 2012/0306788 A1 | 12/2012 | Chen et al. |
| 2012/0311476 A1 | 12/2012 | Campbell |
| 2012/0324384 A1 | 12/2012 | Cohen et al. |
| 2013/0038564 A1* | 2/2013 | Ho .............. G06F 3/0488 345/174 |
| 2013/0044070 A1 | 2/2013 | Townsend et al. |
| 2013/0063891 A1* | 3/2013 | Martisauskas ........ G06F 1/1643 361/679.56 |
| 2013/0088434 A1* | 4/2013 | Masuda .............. G06F 1/3262 345/173 |
| 2013/0093691 A1* | 4/2013 | Moosavi .............. G06F 3/04883 345/173 |
| 2013/0117715 A1 | 5/2013 | Williams et al. |
| 2013/0154999 A1* | 6/2013 | Guard .............. G06F 3/0487 345/174 |
| 2013/0181902 A1 | 7/2013 | Hinckley et al. |
| 2013/0222287 A1 | 8/2013 | Bae et al. |
| 2013/0257768 A1* | 10/2013 | Lee .............. G06F 3/0416 345/173 |
| 2013/0265269 A1 | 10/2013 | Sharma et al. |
| 2013/0271447 A1 | 10/2013 | Setlur et al. |
| 2013/0275914 A1 | 10/2013 | Zhuo |
| 2013/0300668 A1 | 11/2013 | Churikov |
| 2013/0335453 A1* | 12/2013 | Lim .............. G09G 5/373 345/661 |
| 2014/0022183 A1* | 1/2014 | Ayoub .............. H04W 4/023 345/173 |
| 2014/0043265 A1 | 2/2014 | Chang et al. |
| 2014/0043277 A1 | 2/2014 | Saukko et al. |
| 2014/0092041 A1* | 4/2014 | Ih .............. G06F 3/044 345/173 |
| 2014/0111462 A1 | 4/2014 | Townsend et al. |
| 2014/0132551 A1 | 5/2014 | Bathiche |
| 2014/0192019 A1 | 7/2014 | Fukushima |
| 2014/0195957 A1 | 7/2014 | Bang |
| 2014/0253477 A1* | 9/2014 | Shim .............. G06F 3/0416 345/173 |
| 2014/0289668 A1 | 9/2014 | Mavrody |
| 2014/0293145 A1* | 10/2014 | Jones .............. G06F 1/1626 349/12 |
| 2014/0337791 A1 | 11/2014 | Agnetta et al. |
| 2015/0042588 A1* | 2/2015 | Park .............. G06F 3/0412 345/173 |
| 2015/0145797 A1* | 5/2015 | Corrion .............. G06F 3/0416 345/173 |
| 2015/0160849 A1* | 6/2015 | Weiss .............. G06F 3/044 345/174 |
| 2015/0227166 A1* | 8/2015 | Lee .............. G06F 1/169 345/173 |
| 2015/0261362 A1 | 9/2015 | King |
| 2015/0261364 A1 | 9/2015 | Cady et al. |
| 2016/0110024 A1 | 4/2016 | Townsend et al. |
| 2016/0283104 A1 | 9/2016 | Hinckley et al. |
| 2017/0131835 A1 | 5/2017 | Bathiche |

(56) References Cited

U.S. PATENT DOCUMENTS

| | | | |
|---|---|---|---|
| 2017/0147148 | A1 | 5/2017 | Townsend et al. |
| 2017/0177100 | A1 | 6/2017 | Townsend et al. |
| 2017/0177101 | A1 | 6/2017 | Townsend et al. |

FOREIGN PATENT DOCUMENTS

| | | |
|---|---|---|
| CN | 1704888 | 12/2005 |
| CN | 1766824 | 5/2006 |
| CN | 1936799 | 3/2007 |
| CN | 101198925 | 6/2008 |
| CN | 201181467 | 1/2009 |
| CN | 101404687 | 4/2009 |
| CN | 101410781 | 4/2009 |
| CN | 101432677 | 5/2009 |
| CN | 101482790 | 7/2009 |
| CN | 101496404 | 7/2009 |
| CN | 201298220 | 8/2009 |
| CN | 101551728 | 10/2009 |
| CN | 101566865 | 10/2009 |
| CN | 101576789 | 11/2009 |
| CN | 101609383 | 12/2009 |
| CN | 101627361 | 1/2010 |
| CN | 101636711 | 1/2010 |
| CN | 101668056 | 3/2010 |
| CN | 102207788 | 10/2011 |
| EP | 0388344 | 2/1995 |
| EP | 1942401 | 7/2008 |
| EP | 2081107 | 7/2009 |
| EP | 2148268 | 1/2010 |
| EP | 2466442 | 6/2012 |
| EP | 2261781 | 10/2012 |
| EP | 2560088 | 2/2013 |
| EP | 2634678 | 9/2013 |
| JP | 6282368 | 10/1994 |
| JP | 7281810 | 10/1995 |
| JP | 2001265523 | 9/2001 |
| JP | 2001290585 | 10/2001 |
| JP | 2002055753 | 2/2002 |
| JP | 2003195998 | 7/2003 |
| JP | 2005004690 | 1/2005 |
| JP | 2005026834 | 1/2005 |
| JP | 2005122271 | 5/2005 |
| JP | 2005149279 | 6/2005 |
| JP | 2007240964 | 9/2007 |
| JP | 3143462 | 7/2008 |
| JP | 2008532185 | 8/2008 |
| JP | 2008217742 | 9/2008 |
| JP | 2008305087 | 12/2008 |
| JP | 2009097724 | 4/2009 |
| JP | 2010019643 | 1/2010 |
| JP | 2010026834 | 2/2010 |
| JP | 2010250465 | 11/2010 |
| KR | 20090013927 | 2/2009 |
| KR | 1020090088501 | 8/2009 |
| KR | 20090106755 | 10/2009 |
| TW | 200921478 | 5/2009 |
| TW | 200947297 | 11/2009 |
| TW | 200951783 | 12/2009 |
| WO | WO-9928812 | 1/1999 |
| WO | WO-2009086628 | 7/2009 |
| WO | WO-2009131987 | 10/2009 |
| WO | WO-2011106467 | 9/2011 |
| WO | WO-2011106468 | 9/2011 |

OTHER PUBLICATIONS

"In touch with new opportunities—Dispersive Signal Technology", DataSheet, NXT, 2005, 1 page.

"TouchSystems—Innovation Touch Screen Solution", Retrieved from <http://www.touchsystems.com/article.aspx?id=16> on Aug. 30, 2012, Aug. 14, 2012, 1 page.

"Final Office Action", U.S. Appl. No. 12/713,110, dated Jan. 17, 2013, 10 pages.

"Final Office Action", U.S. Appl. No. 13/674,357, dated Jan. 29, 2015, 10 pages.

"Final Office Action", U.S. Appl. No. 12/695,842, dated Feb. 2, 2016, 10 pages.

"Non-Final Office Action", U.S. Appl. No. 12/695,976, dated Mar. 25, 2015, 10 pages.

"Non-Final Office Action", U.S. Appl. No. 12/472,699, dated Mar. 28, 2013, 10 pages.

"Non-Final Office Action", U.S. Appl. No. 12/713,110, dated May 3, 2013, 10 pages.

"Final Office Action", U.S. Appl. No. 12/713,133, dated May 20, 2013, 10 pages.

"Final Office Action", U.S. Appl. No. 13/484,075, dated May 21, 2013, 10 pages.

"Non-Final Office Action", U.S. Appl. No. 13/674,357, dated Jun. 4, 2015, 10 pages.

"Final Office Action", U.S. Appl. No. 13/484,075, dated Jul. 16, 2015, 10 pages.

"Non-Final Office Action", U.S. Appl. No. 14/212,916, dated Aug. 7, 2015, 10 pages.

"Foreign Office Action", CN Application No. 201180010692.2, dated Sep. 15, 2015, 10 Pages.

"International Search Report and Written Opinion", Application No. PCT/US2011/025132, dated Oct. 26, 2011, 10 pages.

"Final Office Action", U.S. Appl. No. 12/713,118, dated Oct. 26, 2012, 10 pages.

"International Search Report and Written Opinion", Application No. PCT/US2011/025131, dated Oct. 31, 2011, 10 pages.

"Final Office Action", U.S. Appl. No. 14/145,204, dated Nov. 12, 2014, 10 pages.

"Final Office Action", U.S. Appl. No. 12/695,976, dated Nov. 21, 2012, 10 pages.

"Non-Final Office Action", U.S. Appl. No. 12/700,357, dated Dec. 16, 2015, 10 pages.

"Non-Final Office Action", U.S. Appl. No. 13/657,662, dated Apr. 5, 2013, 10 pages.

"International Search Report and Written Opinion", Application No. PCT/US2013/020413, dated Apr. 8, 2013, 10 pages.

"Non-Final Office Action", U.S. Appl. No. 12/700,357, dated Jul. 2, 2012, 10 pages.

"Final Office Action", U.S. Appl. No. 12/713,053, dated Aug. 17, 2012, 10 pages.

"Non-Final Office Action", U.S. Appl. No. 12/713,118, dated Jan. 29, 2015, 11 pages.

"Non-Final Office Action", U.S. Appl. No. 12/709,282, dated Feb. 28, 2013, 11 pages.

"Foreign Office Action", CN Application No. 201110050852.8, dated Mar. 26, 2013, 11 pages.

"Foreign Office Action", CN Application No. 201110050506.X, dated Apr. 2, 2013, 11 pages.

"Non-Final Office Action", U.S. Appl. No. 12/695,937, dated May 7, 2014, 11 pages.

"Non-Final Office Action", U.S. Appl. No. 12/713,113, dated Jun. 4, 2014, 11 pages.

"Non-Final Office Action", U.S. Appl. No. 12/700,357, dated Jun. 26, 2014, 11 pages.

"International Search Report and Written Opinion", Application No. PCT/US2015/019811, dated Jul. 8, 2015, 11 pages.

"Non-Final Office Action", U.S. Appl. No. 12/709,301, dated Jul. 14, 2015, 11 pages.

"Foreign Office Action", CN Application No. 201110046510.9, dated Jul. 25, 2014, 11 Pages.

"Non-Final Office Action", U.S. Appl. No. 13/484,075, dated Sep. 5, 2014, 11 pages.

"Non-Final Office Action", U.S. Appl. No. 12/709,301, dated Oct. 24, 2013, 11 pages.

"Final Office Action", U.S. Appl. No. 13/484,075, dated Nov. 10, 2015, 11 pages.

"Final Office Action", U.S. Appl. No. 12/695,976, dated Nov. 27, 2015, 11 pages.

"Non-Final Office Action", U.S. Appl. No. 12/709,245, dated Nov. 30, 2011, 11 pages.

(56) References Cited

OTHER PUBLICATIONS

"Final Office Action", U.S. Appl. No. 12/709,282, dated Dec. 24, 2012, 11 pages.
"Final Office Action", U.S. Appl. No. 12/709,301, dated Mar. 1, 2012, 11 pages.
"Foreign Office Action", CN Application No. 201110046510.9, dated May 31, 2013, 11 pages.
"Final Office Action", U.S. Appl. No. 12/709,282, dated Jul. 16, 2013, 11 pages.
"Foreign Office Action", CN Application No. 201110046519.X, dated Aug. 6, 2013, 11 pages.
"Foreign Office Action", CN Application No. 201110046529.3, dated Aug. 6, 2013, 11 pages.
"Final Office Action", U.S. Appl. No. 13/484,075, dated Feb. 4, 2015, 12 pages.
"Foreign Office Action", CN Application No. 201110046519.X, dated Mar. 19, 2013, 12 pages.
"Non-Final Office Action", U.S. Appl. No. 12/700,357, dated Apr. 2, 2015, 12 pages.
"Foreign Office Action", CN Application No. 201180011020.3, dated May 4, 2014, 12 Pages.
"Non-Final Office Action", U.S. Appl. No. 12/709,301, dated May 23, 2014, 12 pages.
"Foreign Office Action", CN Application No. 201110044285.5, dated Jun. 20, 2012, 12 pages.
"Final Office Action", U.S. Appl. No. 12/695,976, dated Jul. 23, 2014, 12 pages.
"Final Office Action", U.S. Appl. No. 12/472,699, dated Jul. 29, 2013, 12 pages.
"Final Office Action", U.S. Appl. No. 12/695,976, dated Aug. 5, 2015, 12 pages.
"Final Office Action", U.S. Appl. No. 12/709,301, dated Sep. 3, 2013, 12 pages.
"Foreign Office Action", CN Application No. 201180010769.6, dated Sep. 3, 2014, 12 Pages.
"Final Office Action", U.S. Appl. No. 12/709,376, dated Sep. 10, 2013, 12 pages.
"Final Office Action", U.S. Appl. No. 12/709,348, dated Sep. 12, 2013, 12 pages.
"Final Office Action", U.S. Appl. No. 13/674,357, dated Sep. 17, 2015, 12 pages.
"Final Office Action", U.S. Appl. No. 12/713,113, dated Oct. 8, 2014, 12 pages.
"Non-Final Office Action", U.S. Appl. No. 12/709,282, dated Oct. 10, 2013, 12 pages.
"Final Office Action", U.S. Appl. No. 12/700,357, dated Nov. 20, 2014, 12 pages.
"Non-Final Office Action", U.S. Appl. No. 11/324,157, dated Dec. 11, 2008, 12 pages.
"Non-Final Office Action", U.S. Appl. No. 12/709,348, dated Dec. 7, 2011, 12 pages.
"Final Office Action", U.S. Appl. No. 12/472,699, dated Feb. 15, 2012, 12 pages.
"Apple Unibody MacBook Pro #MB991LL/A 2.53 GHz Intel Core 2 Duo", Retrieved from: <http://www.themacstore.com/parts/show/c-nmb3-mb991II_a> on Nov. 10, 2009, 2009, 12 pages.
"Notice of Allowance", U.S. Appl. No. 12/695,064, dated Mar. 28, 2012, 12 pages.
"Non-Final Office Action", U.S. Appl. No. 12/472,699, dated Sep. 12, 2011, 12 pages.
"Non-Final Office Action", U.S. Appl. No. 13/674,357, dated Feb. 17, 2016, 13 pages.
"Foreign Office Action", CN Application No. 201380005804.4, dated Mar. 1, 2016, 13 Pages.
"Foreign Office Action", JP Application No. 2012-554008, dated Jun. 25, 2015, 13 pages.
"Foreign Office Action", CN Application No. 201180010692.2, dated Jun. 26, 2014, 13 pages.
"Foreign Office Action", CN Application No. 201180009635.2, dated Jul. 28, 2014, 13 pages.
"Foreign Office Action", CN Application No. 201110044285.5, dated Jan. 4, 2013, 13 pages.
"Final Office Action", U.S. Appl. No. 12/709,245, dated Jan. 6, 2012, 13 pages.
"Final Office Action", U.S. Appl. No. 12/700,357, dated Oct. 24, 2012, 13 pages.
"International Search Report and Written Opinion", Application No. PCT/US2011/025973, dated Oct. 27, 2011, 13 pages.
"Final Office Action", U.S. Appl. No. 12/695,937, dated Nov. 10, 2014, 13 pages.
"Non-Final Office Action", U.S. Appl. No. 12/713,053, dated Nov. 23, 2012, 13 pages.
"Notice of Allowance", U.S. Appl. No. 12/713,110, dated Dec. 4, 2013, 13 pages.
"Final Office Action", U.S. Appl. No. 12/709,348, dated Feb. 17, 2012, 13 pages.
"Notice of Allowance", U.S. Appl. No. 12/695,959, dated Apr. 17, 2012, 13 pages.
"Final Office Action", U.S. Appl. No. 12/695,937, dated Jul. 26, 2012, 13 pages.
"Foreign Office Action", CN Application No. 201110046519.X, dated Aug. 2, 2012, 13 pages.
"Non-Final Office Action", U.S. Appl. No. 12/709,301, dated Sep. 13, 2012, 13 pages.
"Final Office Action", U.S. Appl. No. 12/709,301, dated Jan. 7, 2013, 14 pages.
"Notice of Allowance", U.S. Appl. No. 12/713,096, dated Jan. 9, 2015, 14 pages.
"Decision on Reexamination", CN Application No. 201110044285.5, dated Mar. 26, 2015, 14 Pages.
"Final Office Action", U.S. Appl. No. 12/695,937, dated Apr. 2, 2015, 14 pages.
"Non-Final Office Action", U.S. Appl. No. 12/709,204, dated May 7, 2015, 14 pages.
"Non-Final Office Action", U.S. Appl. No. 12/709,301, dated May 14, 2013, 14 pages.
"Final Office Action", U.S. Appl. No. 11/324,157, dated Jun. 24, 2009, 14 pages.
"Notice of Allowance", U.S. Appl. No. 12/713,096, dated Aug. 29, 2014, 14 pages.
"Final Office Action", U.S. Appl. No. 12/700,357, dated Aug. 31, 2015, 14 pages.
"Non-Final Office Action", U.S. Appl. No. 12/709,376, dated Jan. 23, 2012, 14 pages.
"Non-Final Office Action", U.S. Appl. No. 12/472,699, dated Oct. 23, 2013, 14 pages.
"Non-Final Office Action", U.S. Appl. No. 12/709,245, dated Mar. 21, 2012, 14 pages.
"Non-Final Office Action", U.S. Appl. No. 12/695,937, dated Apr. 25, 2012, 14 pages.
"Foreign Office Action", CN Application No. 201110046529.3, dated Aug. 16, 2012, 14 pages.
"Non-Final Office Action", U.S. Appl. No. 12/709,348, dated Aug. 2, 2012, 14 pages.
"International Search Report and Written Opinion", Application No. PCT/US/2011025972, dated Sep. 30, 2011, 14 pages.
"International Search Report and Written Opinion", Application No. PCT/US2011/025575, dated Sep. 30, 2011, 14 pages.
"Final Office Action", U.S. Appl. No. 12/709,348, dated Jan. 7, 2013, 15 pages.
"Non-Final Office Action", U.S. Appl. No. 12/709,348, dated Apr. 25, 2013, 15 pages.
"Non-Final Office Action", U.S. Appl. No. 12/709,245, dated May 30, 2013, 15 pages.
"Non-Final Office Action", U.S. Appl. No. 14/099,798, dated Jun. 9, 2015, 15 pages.
"Final Office Action", U.S. Appl. No. 12/713,127, dated Aug. 14, 2014, 15 pages.
"International Search Report and Written Opinion", Application No. PCT/US2011/025971, dated Oct. 31, 2011, 15 pages.
"Final Office Action", U.S. Appl. No. 12/709,245, dated Mar. 15, 2013, 16 pages.

(56) References Cited

OTHER PUBLICATIONS

"Non-Final Office Action", U.S. Appl. No. 12/709,245, dated Mar. 20, 2014, 16 pages.
"Foreign Office Action", CN Application No. 201180009579.2, dated Apr. 21, 2015, 16 Pages.
"Non-Final Office Action", U.S. Appl. No. 11/324,157, dated Apr. 28, 2010, 16 pages.
"Non-Final Office Action", U.S. Appl. No. 12/695,842, dated May 22, 2013, 16 pages.
"Foreign Office Action", CN Application No. 201180011039.8, dated Jun. 5, 2014, 16 Pages.
"Foreign Office Action", CN Application No. 201110046519.X, dated Sep. 21, 2015, 16 Pages.
"Non-Final Office Action", U.S. Appl. No. 12/695,842, dated Oct. 3, 2012, 16 pages.
"Foreign Office Action", CN Application No. 201180009579.2, dated Nov. 4, 2014, 16 pages.
"Final Office Action", U.S. Appl. No. 12/709,376, dated Mar. 30, 2012, 16 pages.
"Foreign Office Action", CN Application No. 201180011039.8, dated Feb. 17, 2015, 17 Pages.
"Final Office Action", U.S. Appl. No. 12/709,282, dated May 9, 2014, 17 pages.
"Non-Final Office Action", U.S. Appl. No. 12/709,376, dated May 23, 2013, 17 pages.
"Non-Final Office Action", U.S. Appl. No. 11/324,157, dated Sep. 28, 2009, 17 pages.
"Final Office Action", U.S. Appl. No. 12/695,842, dated Dec. 2, 2013, 17 pages.
"Non-Final Office Action", U.S. Appl. No. 12/709,376, dated Aug. 17, 2012, 17 pages.
"Non-Final Office Action", U.S. Appl. No. 12/713,127, dated Mar. 26, 2015, 18 pages.
"Non-Final Office Action", U.S. Appl. No. 14/099,798, dated Mar. 31, 2016, 18 pages.
"Non-Final Office Action", U.S. Appl. No. 12/713,113, dated Apr. 23, 2013, 18 pages.
"Non-Final Office Action", U.S. Appl. No. 12/695,842, dated Aug. 13, 2015, 18 pages.
"Final Office Action", U.S. Appl. No. 11/324,157, dated Oct. 15, 2010, 18 pages.
"Non-Final Office Action", U.S. Appl. No. 12/713,081, dated Dec. 23, 2011, 18 pages.
"Final Office Action", U.S. Appl. No. 12/713,113, dated Jun. 4, 2012, 18 pages.
"Final Office Action", U.S. Appl. No. 12/713,127, dated Jun. 6, 2012, 18 pages.
"International Search Report and Written Opinion", Application No. PCT/US2014/067804, dated Jul. 24, 2015, 19 Pages.
"Final Office Action", U.S. Appl. No. 12/713,127, dated Jul. 31, 2015, 19 pages.
"Non-Final Office Action", U.S. Appl. No. 13/352,193, dated Aug. 20, 2014, 19 pages.
"Foreign Office Action", CN Application No. 201180009579.2, dated Sep. 6, 2015, 19 pages.
"Final Office Action", U.S. Appl. No.14/099,798, dated Nov. 25, 2015, 19 pages.
"Final Office Action", U.S. Appl. No. 12/713,081, dated May 9, 2012, 19 pages.
"Supplemental Notice of Allowance", U.S. Appl. No. 12/713,133, dated Feb. 3, 2014, 2 pages.
"Corrected Notice of Allowance", U.S. Appl. No. 14/212,916, dated Mar. 3, 2016, 2 pages.
"Supplemental Notice of Allowance", U.S. Appl. No. 12/713,118, dated Mar. 19, 2015, 2 pages.
"Touch Screen is available in .36-50.8 mm thickness", ThomasNet Industrial News Room, Jul. 29, 2003, 2 pages.
"AccuScribe Touchscreens", Datasheet, Elo TouchSystem, Aug. 2005, 2 pages.
"Dell and Windows 7—The Wait is Over", Retrieved from: <http://content.dell.com/us/en/corp/d/press-releases/2009-10-22-Dell-and-Windows-7.aspx> on Nov. 10, 2009, Oct. 22, 2009, 2 pages.
"Supplemental Notice of Allowance", U.S. Appl. No. 12/713,096, dated Nov. 4, 2014, 2 pages.
"Advisory Action", U.S. Appl. No. 12/709,376, dated Dec. 19, 2013, 2 pages.
"Final Office Action", U.S. Appl. No. 12/695,842, dated Feb. 12, 2015, 20 pages.
"Foreign Office Action", CN Application No. 201180007100.1, dated May 15, 2015, 20 Pages.
"Final Office Action", U.S. Appl. No. 12/709,376, dated Nov. 8, 2012, 20 pages.
"Non-Final Office Action", U.S. Appl. No. 12/713,113, dated Dec. 22, 2011, 20 pages.
"Non-Final Office Action", U.S. Appl. No. 12/700,510, dated Feb. 7, 2012, 20 pages.
"Non-Final Office Action", U.S. Appl. No. 12/709,204, dated May 10, 2012, 20 pages.
"Non-Final Office Action", U.S. Appl. No. 12/713,127, dated Jan. 31, 2014, 21 pages.
"Non-Final Office Action", U.S. Appl. No. 13/352,193, dated Apr. 9, 2015, 21 pages.
"Non-Final Office Action", U.S. Appl. No. 12/713,110, dated Jun. 21, 2012, 21 pages.
"Non-Final Office Action", U.S. Appl. No. 12/695,842, dated Aug. 18, 2014, 21 pages.
"Non-Final Office Action", U.S. Appl. No. 13/898,452, dated Sep. 26, 2014, 21 pages.
"Non-Final Office Action", U.S. Appl. No. 12/700,460, dated Jan. 13, 2012, 21 pages.
"Final Office Action", U.S. Appl. No. 12/713,113, dated Oct. 8, 2013, 21 pages.
"Final Office Action", U.S. Appl. No. 13/352,193, dated Jan. 12, 2015, 22 pages.
"Non-Final Office Action", U.S. Appl. No. 12/709,282, dated Jan. 29, 2015, 22 pages.
"Non-Final Office Action", U.S. Appl. No. 13/352,193, dated Jan. 31, 2014, 22 pages.
"Ex Parte Mewherter, PTAB precedential decision", U.S. Appl. No. 10/685,192, filed May 8, 2013, 22 pages.
"Foreign Office Action", CN Application No. 201180007100.1, dated Sep. 10, 2014, 22 pages.
"Non-Final Office Action", U.S. Appl. No. 12/713,127, dated Dec. 27, 2011, 22 pages.
"Non-Final Office Action", U.S. Appl. No. 12/713,096, dated Jan. 30, 2014, 23 pages.
"Non-Final Office Action", U.S. Appl. No. 13/352,193, dated Mar. 22, 2016, 23 pages.
"Final Office Action", U.S. Appl. No. 13/898,452, dated Mar. 27, 2015, 23 pages.
"Final Office Action", U.S. Appl. No. 13/352,193, dated May 23, 2014, 23 pages.
"Non-Final Office Action", U.S. Appl. No. 13/898,452, dated Sep. 14, 2015, 23 pages.
"Final Office Action", U.S. Appl. No. 13/352,193, dated Oct. 1, 2015, 23 pages.
"Final Office Action", U.S. Appl. No. 12/700,510, dated Oct. 10, 2012, 23 pages.
"Non-Final Office Action", U.S. Appl. No. 12/713,113, dated Feb. 12, 2015, 24 pages.
"Non-Final Office Action", U.S. Appl. No. 13/898,452, dated Feb. 24, 2014, 24 pages.
"Final Office Action", U.S. Appl. No. 12/709,204, dated Apr. 11, 2014, 24 pages.
"Final Office Action", U.S. Appl. No. 12/709,282, dated Aug. 24, 2015, 24 pages.
"Final Office Action", U.S. Appl. No. 12/709,204, dated Sep. 12, 2013, 24 pages.
"Final Office Action", U.S. Appl. No. 12/709,204, dated Oct. 3, 2012, 24 pages.
"Final Office Action", U.S. Appl. No. 13/898,452, dated Mar. 10, 2016, 25 pages.

(56) References Cited

OTHER PUBLICATIONS

"Non-Final Office Action", U.S. Appl. No. 12/709,204, dated Aug. 13, 2014, 25 pages.
"Final Office Action", U.S. Appl. No. 13/898,452, dated Jun. 9, 2014, 26 pages.
"Non-Final Office Action", U.S. Appl. No. 12/700,510, dated Jun. 12, 2014, 26 pages.
"Final Office Action", U.S. Appl. No. 12/713,113, dated Aug. 5, 2015, 26 pages.
"Final Office Action", U.S. Appl. No. 12/700,460, dated Aug. 28, 2012, 26 pages.
"Non-Final Office Action", U.S. Appl. No. 12/709,204, dated Jun. 6, 2013, 27 pages.
"Final Office Action", U.S. Appl. No. 12/700,510, dated Feb. 3, 2015, 28 pages.
"Final Office Action", U.S. Appl. No. 12/709,204, dated Jan. 12, 2015, 29 pages.
"Advisory Action", U.S. Appl. No. 12/695,842, dated Mar. 28, 2016, 3 pages.
"Advisory Action", U.S. Appl. No. 12/695,842, dated May 12, 2015, 3 pages.
"3M Touch Systems, Inc. Announces Shipment of Dispersive Signal Technology Product", Datasheet, 3M Corporation, retrieved from <http://solutions.3m.com/wps/portal/3M/en_US/TouchSystems/TouchScreen/Informatio/Media/PressReleases/Archive/?PC_7_RJH9U52300FA602N9RSR991OI3000000_assetId=1114287537178<, Sep. 6, 2005, 3 pages.
"Supplementary European Search Report", EP Application No. 11737428.0, dated Nov. 13, 2004, 3 pages.
"Supplementary European Search Report", EP Application No. 11748027.7, dated Nov. 29, 2012, 3 pages.
"Supplementary European Search Report", EP Application No. 11747907.1, dated Nov. 7, 2012, 3 pages.
"Supplementary European Search Report", EP Application No. 11748028.5, dated Nov. 7, 2012, 3 pages.
"Non-Final Office Action", U.S. Appl. No. 12/709,204, dated Nov. 20, 2013, 31 pages.
"Non-Final Office Action", U.S. Appl. No. 12/700,510, dated Aug. 28, 2015, 34 pages.
"Final Office Action", U.S. Appl. No. 12/700,510, dated Mar. 14, 2016, 36 pages.
"Foreign Notice of Allowance", CN Application No. 201180011039.8, dated Jan. 13, 2016, 4 Pages.
"Notice of Allowance", U.S. Appl. No. 12/713,133, dated Jan. 17, 2014, 4 pages.
"Notice of Allowance", U.S. Appl. No. 12/709,245, dated Jan. 30, 2015, 4 pages.
"Non-Final Office Action", U.S. Appl. No. 14/979,910, dated Feb. 22, 2016, 4 pages.
"Foreign Notice of Allowance", JP Application No. 2012-555062, dated Mar. 3, 2015, 4 Pages.
"Notice of Allowance", U.S. Appl. No. 12/713,118, dated Mar. 5, 2015, 4 pages.
"Foreign Notice of Allowance", CN Application No. 201180009579.2, dated Mar. 7, 2016, 4 Pages.
"Notice of Allowance", U.S. Appl. No. 12/709,245, dated Apr. 28, 2015, 4 pages.
"Foreign Notice of Allowance", CN Application No. 201180010769.6, dated Apr. 30, 2015, 4 Pages.
"Foreign Notice of Allowance", CN Application No. 201110050506.X, dated Nov. 2, 2014, 4 Pages.
"Foreign Office Action", EP Application No. 11737428.0, dated Nov. 18, 2013, 4 pages.
"Non-Final Office Action", U.S. Appl. No. 12/713,130, dated Jan. 16, 2013, 5 pages.
"Non-Final Office Action", U.S. Appl. No. 12/709,301, dated Jan. 16, 2015, 5 pages.
"Notice of Allowance", U.S. Appl. No. 12/713,130, dated Feb. 19, 2013, 5 pages.
"Notice of Allowance", U.S. Appl. No. 14/145,204, dated Sep. 25, 2015, 5 pages.
"Foreign Office Action", EP Application No. 11748026.9, dated Jan. 16, 2013, 5 pages.
"Foreign Office Action", EP Application No. 11748029.3, dated Jan. 16, 2013, 5 pages.
"Foreign Office Action", EP Application No. 11748027.7, dated Jan. 18, 2013, 5 pages.
"Foreign Office Action", EP Application No. 11747907.1, dated Jan. 28, 2013, 5 pages.
"Foreign Office Action", EP Application No. 11748028.5, dated Jan. 28, 2013, 5 pages.
"Non-Final Office Action", U.S. Appl. No. 12/713,096, dated Dec. 30, 2015, 5 pages.
"Non-Final Office Action", U.S. Appl. No. 14/145,204, dated Feb. 5, 2014, 5 pages.
"Foreign Notice of Allowance", CN Application No. 201110046510.9, dated Feb. 12, 2015, 6 Pages.
"Notice of Allowance", U.S. Appl. No. 12/709,376, dated Mar. 17, 2014, 6 pages.
"(Need English Summary) Foreign Office Action", CN Application No. 201180010692.2, dated Mar. 28, 2016, 6 Pages.
"Notice of Allowance", U.S. Appl. No. 12/472,699, dated May 2, 2014, 6 pages.
"Notice of Allowance", U.S. Appl. No. 12/709,301, dated Sep. 8, 2015, 6 pages.
"Final Office Action", U.S. Appl. No. 12/709,245, dated Nov. 14, 2014, 6 pages.
"Foreign Office Action", CN Application No. 201110050506.X, dated Feb. 26, 2014, 6 pages.
"3M TouchWare TM Software for Windows User Guide", In White Paper of 3M Touch Systems—Retrieved at: <<http://multimedia.3m.com/mws/mediawebserver?6666660Zjcf6IVs6EVs66SS0LCOrrrrQ—>>, Aug. 9, 2013, 65 pages.
"Notice of Allowance", U.S. Appl. No. 12/709,301, dated Feb. 24, 2016, 7 pages.
"Notice of Allowance", U.S. Appl. No. 12/713,053, dated Jun. 7, 2013, 7 pages.
"Extended European Search Report", EP Application No. 13738283.4, dated Aug. 4, 2015, 7 pages.
"Foreign Office Action", CN Application No. 201180011039.8, dated Sep. 6, 2015, 7 pages.
"Notice of Allowance", U.S. Appl. No. 12/709,204, dated Sep. 25, 2015, 7 pages.
"Non-Final Office Action", U.S. Appl. No. 12/713,130, dated Jan. 23, 2012, 7 pages.
"Non-Final Office Action", U.S. Appl. No. 12/713,133, dated Jan. 31, 2012, 7 pages.
"Notice of Allowance", U.S. Appl. No. 13/657,662, dated Oct. 11, 2013, 7 pages.
"Foreign Office Action", JP Application No. 2012-554008, dated Nov. 25, 2014, 7 pages.
"Final Office Action", U.S. Appl. No. 12/713,096, dated Feb. 15, 2013, 7 pages.
"Non-Final Office Action", U.S. Appl. No. 12/713,118, dated Jun. 8, 2012, 7 pages.
"UI Guidelines Version 2.1", Retrieved from: http://na.blackberry.com/eng/deliverables/6622/BlackBerry_Smartphones-US.pdf., 76 Pages.
"Non-Final Office Action", U.S. Appl. No. 12/713,133, dated Jan. 14, 2013, 8 pages.
"Foreign Office Action", CN Application No. 201110044285.5, dated Apr. 24, 2013, 8 pages.
"Non-Final Office Action", U.S. Appl. No. 13/484,075, dated Apr. 29, 2015, 8 pages.
"Notice of Allowance", U.S. Appl. No. 11/324,157, dated May 9, 2011, 8 pages.
"Notice on Reexamination", CN Application No. 201110044285.5, dated Jul. 23, 2014, 8 Pages.
"Non-Final Office Action", U.S. Appl. No. 13/674,357, dated Aug. 4, 2014, 8 pages.

(56) References Cited

OTHER PUBLICATIONS

"International Search Report and Written Opinion", Application No. PCT/US2011/020417, dated Oct. 20, 2011, 8 pages.
"International Search Report and Written Opinion", Application No. PCT/US2011/025974, dated Oct. 26, 2011, 8 pages.
"Foreign Office Action", CN Application No. 201110050852.8, dated Nov. 1, 2013, 8 Pages.
"Non-Final Office Action", U.S. Appl. No. 12/709,301, dated Nov. 19, 2015, 8 pages.
"Second Written Opinion", Application No. PCT/US2014/067804, dated Nov. 24, 2015, 8 Pages.
"Foreign Office Action", CN Application No. 201110050499.3, dated Nov. 27, 2012, 8 pages.
"Non-Final Office Action", U.S. Appl. No. 12/713,133, dated Dec. 10, 2013, 8 pages.
"Foreign Office Action", CN Application No. 201110044285.5, dated Dec. 22, 2014, 8 Pages.
"Notice of Allowance", U.S. Appl. No. 14/212,916, dated Dec. 24, 2015, 8 pages.
"Non-Final Office Action", U.S. Appl. No. 12/713,053, dated Feb. 3, 2012, 8 pages.
"Foreign Office Action", CN Application No. 201110050508.9, dated Mar. 7, 2013, 8 pages.
"Notice of Allowance", U.S. Appl. No. 13/230,700, dated May 15, 2012, 8 pages.
"Notice of Allowance", U.S. Appl. No. 13/230,700, dated Jun. 21, 2012, 8 pages.
"Non-Final Office Action", U.S. Appl. No. 12/713,096, dated Jun. 26, 2013, 8 pages.
"Final Office Action", U.S. Appl. No. 12/713,130, dated Jun. 29, 2012, 8 pages.
"Final Office Action", U.S. Appl. No. 12/713,133, dated Jul. 2, 2012, 8 pages.
"Foreign Office Action", CN Application No. 201110050499.3, dated Aug. 3, 2012, 8 pages.
"Foreign Office Action", CN Application No. 201110050508.9, dated Aug. 3, 2012, 8 pages.
"Non-Final Office Action", U.S. Appl. No. 12/695,976, dated Sep. 11, 2012, 8 pages.
"Non-Final Office Action", U.S. Appl. No. 13/484,075, dated Jan. 15, 2013, 9 pages.
"Foreign Office Action", CN Application No. 201180011020.3, dated Jan. 15, 2015, 9 Pages.
"Foreign Office Action", CN Application No. 201110046510.9, dated Feb. 12, 2014, 9 Pages.
"International Preliminary Report on Patentability", Application No. PCT/US2014/067804, dated Feb. 22, 2016, 9 pages.
"Non-Final Office Action", U.S. Appl. No. 14/145,204, dated Feb. 24, 2015, 9 Pages.
"Foreign Office Action", CN Application No. 201180010692.2, dated Mar. 10, 2015, 9 Pages.
"Decision on Reexamination", CN Application No. 201110046519.X, dated May 28, 2015, 9 Pages.
"New MS Courier Leak Details Multi-Touch Interface", Retrieved from: <http://www.electronista.com/articles/09/11/04/courier.gestures.ui.explained/> on Nov. 10, 2009, Nov. 4, 2009, 9 pages.
"Non-Final Office Action", U.S. Appl. No. 12/709,301, dated Nov. 28, 2011, 9 pages.
"Non-Final Office Action", U.S. Appl. No. 12/713,081, dated Nov. 29, 2012, 9 pages.
"Non-Final Office Action", U.S. Appl. No. 12/709,348, dated Dec. 20, 2013, 9 pages.
"Foreign Office Action", CN Application No. 201110046529.3, dated Feb. 4, 2013, 9 pages.
"Non-Final Office Action", U.S. Appl. No. 12/709,282, dated Apr. 12, 2012, 9 pages.
"Non-Final Office Action", U.S. Appl. No. 12/713,096, dated Jun. 6, 2012, 9 pages.
"International Search Report and Written Opinion", Application No. PCT/US2011/020412, dated Aug. 31, 2011, 9 pages.

"International Search Report and Written Opinion", Application No. PCT/US2011/020410, dated Sep. 27, 2011, 9 pages.
"iQuery & Css Example—Dropdown Menu", DesignReviver, Retrieved from: <http://designreviver.com/tutorials/jquery-css-example-dropdown-menu/> on Nov. 22, 2011, Oct. 7, 2008, 30 pages.
Appleinsider,"Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, Oct. 26, 2006, 10 pages.
Boudreaux,"Touch Patterns: Chapter 6—Programming the iPhone User Experience", retrieved from <http://oreilly.com/iphone/excerpts/iphone-programming-user/touch-patterns.html> on Oct. 25, 2011, 12 pages.
Brandl,"Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories, May 2008, 10 pages.
Daniels,"Brave New World", Retrieved from: <http://bookseller-association.blogspot.com/2009_03_01_archive.html> on Nov. 10, 2009, Mar. 2009, 54 pages.
Elliott,"First Dell, Then HP: What's Next for N-trig's Multitouch Screen Technology", Retrieved from: <http://news.cnet.com/8301-17938_105-10107886-1.html> on Nov. 11, 2009, Nov. 25, 2008, 5 pages.
Emigh,"Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, Sep. 15, 2009, 3 pages.
Findlater,"Personalized Input: Improving Ten-Finger Touchscreen Typing through Automatic Adaptation", Proceedings of the SIGCHI Conference on Human Factors in Computing Systems, Available at <http://terpconnect.umd.edu/~leahkf/pubs/CHI2012-findlater-PersonalizedTyping.pdf>, May 5, 2012, 10 pages.
Fonseca,"New Apple Patent Hints at Touch Enabled Bezels for Future Devices", Retrieved from: <http://vr-zone.com/articles/new-apple-patent-hints-at-touch-enabled-bezels-for-future-devices/42928.html?utm_source=rss&utm_medium=rss&utm_campaign=new-apple-patent-hints-at-touch-enabled-bezels-for-future-devices> Jan. 31, 2014, Jul. 3, 2013, 6 Pages.
Goel,"GripSense: Using Built-In Sensors to Detect Hand Posture and Pressure on Commodity Mobile Phones", Proceedings of the 25th Annual ACM Symposium on User Interface Software and Technology, Oct. 7, 2012, pp. 545-554.
Gross,"Stretch-A-Sketch: A Dynamic Diagrammer", IEEE Symposium on Visual Languages, Available at <http://depts.washington.edu/dmachine/PAPER/VL94/vl.html>, Oct. 1994, 11 pages.
Hinckley,"Codex: A Dual Screen Tablet Computer", Conference on Human Factors in Computing Systems, Apr. 9, 2009, 10 pages.
Hinckley,"Sensor Synaesthesia: Touch in Motion, and Motion in Touch", CHI 2011, May 7-12, 2011, available at <http://research.microsoft.com/en-us/um/people/kenh/papers/touch-motion-camera-ready-final.pdf>, May 7, 2011, 10 pages.
Hinckley,"Stitching: Pen Gestures that Span Multiple Displays", CHI 2004, Available at <http://www.cs.cornell.edu/~francois/Papers/2004-Hinckley-AVI04-Stitching.>, 2004, pp. 1-8.
Hirche,"Adaptive Interface for Text Input on Large-Scale Interactive Surfaces", 3rd IEEE International Workshop on Horizontal Interactive Human Computer System, Oct. 1, 2008, pp. 153-156.
Hotelling,"Multi-functional hand-held device", U.S. Appl. No. 60/658,777, filed Mar. 4, 2015, 117 pages.
Hotelling,"Multi-functional hand-held device", U.S. Appl. No. 60/663,345, filed Mar. 16, 2005, 76 pages.
Kim,"Hand Grip Pattern Recognition for Mobile User Interfaces", Interaction Lab / Samsung Advanced Institute of Technology, Available at <http://www.alice.org/stage3/pubs/uistsensing.pdf>, 2006, pp. 1789-1794.
Krazit,"Has Apple Found the Magic Touch?", Retrieved from: <http://news.cnet.com/8301-13579_3-9879471-37.html> on Nov. 10, 2009, Feb. 26, 2008, 2 pages.

(56) References Cited

OTHER PUBLICATIONS

Lee,"The TypeWay iPad app is an adaptive on-screen keyboard", Retrieved from <http://www.ubergizmo.com/2012/02/the-typeway-ipad-app-is-an-adaptive-on-screen-keyboard/> on Mar. 7, 2013, Feb. 1, 2012, 2 pages.

Maxwell,"Writing drivers for common touch-screen interface hardware", Industrial Control Design Line, Jun. 15, 2005, 9 pages.

Minsky,"Manipulating Simulated Objects with Real-world Gestures using a Force and Position Sensitive Screen", Computer Graphics, vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>, Jul. 1984, pp. 195-203.

Moore,"TypeWay Adaptive Keyboard for iPad Review", Retrieved from <http://www.technologytell.com/apple/89378/typeway-adaptive-keyboard-for-ipad-review/> on Mar. 6, 2013, Feb. 5, 2012, 10 pages.

Nordgren,"Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.

Olwal,"Rubbing and Tapping for Precise and Rapid Selection on Touch-Screen Displays", Conference on Human Factors in Computing Systems, Available at <http://www.csc.kth.se/~alx/projects/research/rubbing/olwal_rubbing_tapping_chi_2008.pdf>, Apr. 2008, 10 pages.

Panzarino,"Apple's iPad Mini Should have a Widescreen Display", Retrieved from <http://thenextweb.com/apple/2012/08/15/what-ipad-mini-169-instead-43/> on Aug. 29, 2012, Aug. 15, 2012, 6 pages.

Pierce,"Toolspaces and Glances: Storing, Accessing, and Retrieving Objects in 3D Desktop Applications", 1999 Symposium on Interactive 3D Graphics, Available at <http://delivery.acm.org/10.1145/310000/300545/p163-pierce.pdf?key1=300545&key2=8792497521&coll=GUIDE&dl=GUIDE&CFID=61004073&CFTOKEN=28819248>, Apr. 1999, pp. 163-168.

Roth,"Bezel Swipe: Conflict-Free Scrolling and Multiple Selection on Mobile Touch Screen Devices", CHI 2009, Available at <http://www.volkerroth.com/download/Roth2009a.pdf>, Apr. 2009, 4 pages.

Roth,"Bezel Swipe: Conflict-Free Scrolling and Multiple Selection on Mobile Touch Screen Devices", In 27th International Conference on Human Factors in Computing Systems, Retrieved from <http://www.volkerroth.com/download/Roth2009a.pdf>, Apr. 4, 2009, 4 pages.

Roudaut,"Leaf Menus: Linear Menus with Stroke Shortcuts for Small Handheld Devices", Proceedings of the 12th IFIP TC 13 International Conference on Human-Computer Interaction: Part I, Aug. 2009, 4 pages.

Saini,"Designing of a Virtual System with Fingerprint Security by considering many Security Threats", International Journal of Computer Applications, vol. 3—No. 2, available at <http://www.ijcaonline.org/volume3/number2/pxc387995.pdf>, Jun. 2010, pp. 25-31.

Sajid,"Microsoft Patent a Futuristic Virtual Multitouch Keyboard", Retrieved from <http://thetechnopath.com/microsoft-patent-futuristic-virtual-multitouch-keyboard/857/> on Mar. 6, 2013, Sep. 27, 2009, 8 pages.

Sax,"Liquid Keyboard: an Ergonomic, Adaptive QWERTY Keyboard for Touchscreens and Surfaces", ICDS 2011, The Fifth International Conference on Digital Society, Feb. 23, 2011, 6 pages.

Sax,"Liquid Keyboard: An Ergonomic, Adaptive QWERTY Keyboard for Touchscreens", Proceedings of Fifth International Conference on Digital Society, Feb. 23, 2011, pp. 117-122.

Serrano,"Bezel-Tap Gestures: Quick Activation of Commands from Sleep Mode on Tablets", n Proceedings of the SIGCHI Conference on Human Factors in IComputing Systems, Apr. 27, 2013, 10 pages.

T.,"Smartphone displays need a bezel. Here's why", Retrieved from <http://www.phonearena.com/news/Smartphone-displays-need-a-bezel.-Heres-why_id27670> on Aug. 29, 2012, Mar. 12, 2012, 4 pages.

Vallerio,"Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.

Vigil,"Methods for Controlling a Floating Cursor on a Multi-touch Mobile Phone or Tablet in Conjunction with Selection Gestures and Content Gestures", U.S. Appl. No. 61/304,972, filed Feb. 16, 2010, 54 pages.

Yee,"Two-Handed Interaction on a Tablet Display", Retrieved from: <http://zesty.ca/tht/yee-tht-chi2004-short.pdf>, Conference on Human Factors in Computing Systems, Apr. 2004, 4 pages.

"Corrected Notice of Allowance", U.S. Appl. No. 14/212,916, dated May 9, 2016, 2 pages.

"Corrected Notice of Allowance", U.S. Appl. No. 14/212,916, dated May 26, 2016, 6 pages.

"Final Office Action", U.S. Appl. No. 13/674,357, dated Jul. 27, 2016, 9 pages.

"Non-Final Office Action", U.S. Appl. No. 13/898,452, dated Jul. 28, 2016, 26 pages.

"Corrected Notice of Allowance", U.S. Appl. No. 13/674,357, dated Jan. 26, 2017, 2 pages.

"Corrected Notice of Allowance", U.S. Appl. No. 13/674,357, dated Nov. 14, 2016, 2 pages.

"Foreign Office Action", CN Application No. 201380059094.3, dated Dec. 1, 2016, 15 pages.

"Foreign Office Action", EP Application No. 15713073.3, dated Mar. 16, 2017, 4 pages.

"Foreign Notice of Allowance", CN Application No. 201110046519.X, dated Aug. 2, 2016, 4 pages.

"Notice of Allowance", U.S. Appl. No. 13/674,357, dated Oct. 13, 2016, 9 pages.

"Notice of Allowance", U.S. Appl. No. 14/979,910, dated Aug. 31, 2016, 7 pages.

"Notice of Allowance", U.S. Appl. No. 14/979,910, dated Nov. 1, 2016, 7 pages.

"Foreign Office Action", CN Application No. 201380059094.3, dated Aug. 17, 2017, 21 pages.

"Non-Final Office Action", U.S. Appl. No. 15/453,403, dated Jun. 30, 2017, 6 pages.

"Final Office Action", U.S. Appl. No. 13/898,452, dated May 19, 2017, 24 pages.

"Foreign Notice of Allowance", CN Application No. 201380005804.4, dated Sep. 30, 2016, 4 pages.

"International Search Report and Written Opinion", Application No. PCT/US2013/069644, dated Jan. 8, 2014, 11 pages.

"Non-Final Office Action", U.S. Appl. No. 15/426,548, dated Jun. 30, 2017, 6 pages.

"Non-Final Office Action", U.S. Appl. No. 15/453,464, dated Jun. 30, 2017, 7 pages.

"Non-Final Office Action", U.S. Appl. No. 15/543,403, dated Jun. 30, 2017, 6 pages.

"Notice of Allowance", U.S. Appl. No. 13/352,193, dated Jul. 29, 2016, 10 pages.

"Supplemental Notice of Allowance", U.S. Appl. No. 13/352,193, dated Nov. 14, 2016, 2 pages.

* cited by examiner

US 9,946,383 B2

CONDUCTIVE TRACE ROUTING FOR DISPLAY AND BEZEL SENSORS

RELATED APPLICATIONS

This application is a continuation of and claims priority under 35 U.S.C. § 120 to U.S. patent application Ser. No. 14/212,916, filed Mar. 14, 2014, entitled "Conductive Trace Routing for Display and Bezel Sensors," the disclosure of which is incorporated by reference herein in its entirety.

BACKGROUND

Touchscreen functionality has expanded the ways in which a user may interact with a device. One example of such functionality is the recognition of gestures, which may be performed to initiate corresponding operations of the computing device.

However, conventional techniques that were employed to support this interaction were often limited in how the gestures were detected, such as to use touchscreen functionality incorporated directly over a display portion a display device. Additionally, these conventional techniques were often static and thus did not address how the computing device was being used.

Consequently, even though gestures could expand the techniques via which a user may interact with a computing device, conventional implementations of these techniques often did not address how a user interacted with a device to perform these gestures, which could be frustrating to a user as well as inefficient.

SUMMARY

Conductive trace routing techniques for display and bezel sensors are described. In one or more implementations, an apparatus includes display sensors, bezel sensors, and a plurality of conductive traces. The display sensors are configured to detect proximity of an object and are arranged in conjunction with a display area of a display device to support interaction with a user interface displayed by the display device. The bezel sensors are configured to detect proximity of an object and are disposed in a bezel that at least partially surrounds the display device and is outside the display area. The plurality of conductive traces are disposed between the display and bezel sensors and communicatively couple the display sensors and the bezel sensors to one or more computing components that are configured to process inputs received from the display sensors and the bezel sensors.

In one or more implementations, a computing device includes a housing, a touch panel, one or more computing components implemented at least partially in hardware, and a plurality of conductive traces. The housing assumes a handheld form factor that is configured to be held by one or more hands of a user. The touch panel is secured to the housing and includes a display device, display sensors configured to detect proximity of an object and arranged in conjunction with a display area of display device, and bezel sensors disposed in a bezel of the touch panel that are also configured to detection proximity of an object. The one or more computing components are configured to process inputs received from the display and bezel sensors to identify gestures. The plurality of conductive traces are routed between the display and bezel sensors and communicatively couple the display sensors and the bezel sensors to the one or more computing components.

In one or more implementations, a plurality of inputs are received from display and bezel sensors of a touch panel of a computing device that are communicatively coupled to one or more computing components of the computing device using a plurality of conductive traces that are routed between the display and bezel sensors. The inputs are distinguished between inputs received that are indicative of a user's hand as holding a housing of the computing device and inputs that are indicative of a gesture. Performance of one or more operations by the one or more computing components is initiated that correspond to the indicated gesture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Object detection sensors are configured to detect proximity of an object, such as a finger of a user's hand. These sensors may be incorporated as part of a display device to form a touch panel such that a user may interact "directly" with user interface elements (e.g., over a display of) displayed by a display device of the touch panel. Conventional techniques that were utilized to route conductive traces of the sensors involved routing of the traces along a perimeter of the touch panel. As such, these traces could prevent the extension of the sensors to an edge of the touch panel.

Conductive trace routing techniques for display and bezel sensors is described. In one or more implementations a touch panel includes display sensors and bezel sensors. The display sensors are configured to support interaction with a display area of a display device, such as with elements of a user interface as previously described. Bezel sensors are also included that may be configured to detect proximity of an object. The bezel sensors are disposed in a bezel that at least partially surrounds the display area of the display device.

Conductive traces, that communicatively couple the display and bezel sensors to computing components of a computing device that includes the touch panel, are disposed in an area between the display and bezel sensors. In this way, the bezel sensors may be disposed near an edge of a housing of a computing device to support detection of an object near this edge and/or another display device. For example, the bezel sensors may be located in an area between two display devices to support touch functionality between the devices. Thus, the bezel sensors may be utilized to support a variety of functionality, such as to detect whether the computing device is being held by one or more hands of a user, for use of bezel gestures, specific absorption rate (SAR) management techniques, and so on as further described below.

In the following discussion, an example environment is first described that is operable to employ the conductive trace routing and bezel sensor techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
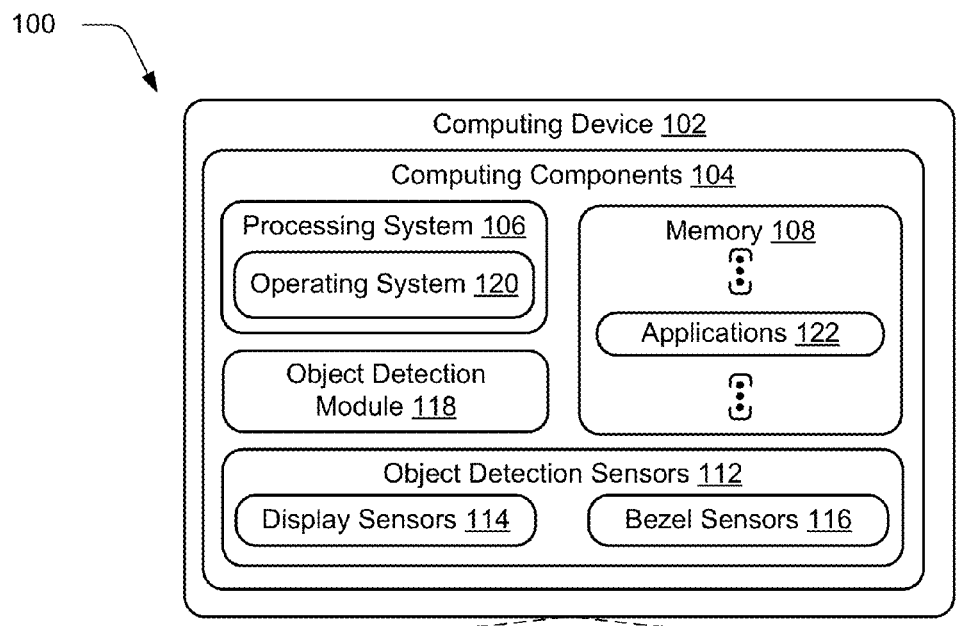
FIG. 1 is an illustration of an environment in an example implementation that is operable to employ the conductive trace routing and bezel sensor techniques described herein.
Figure 1:
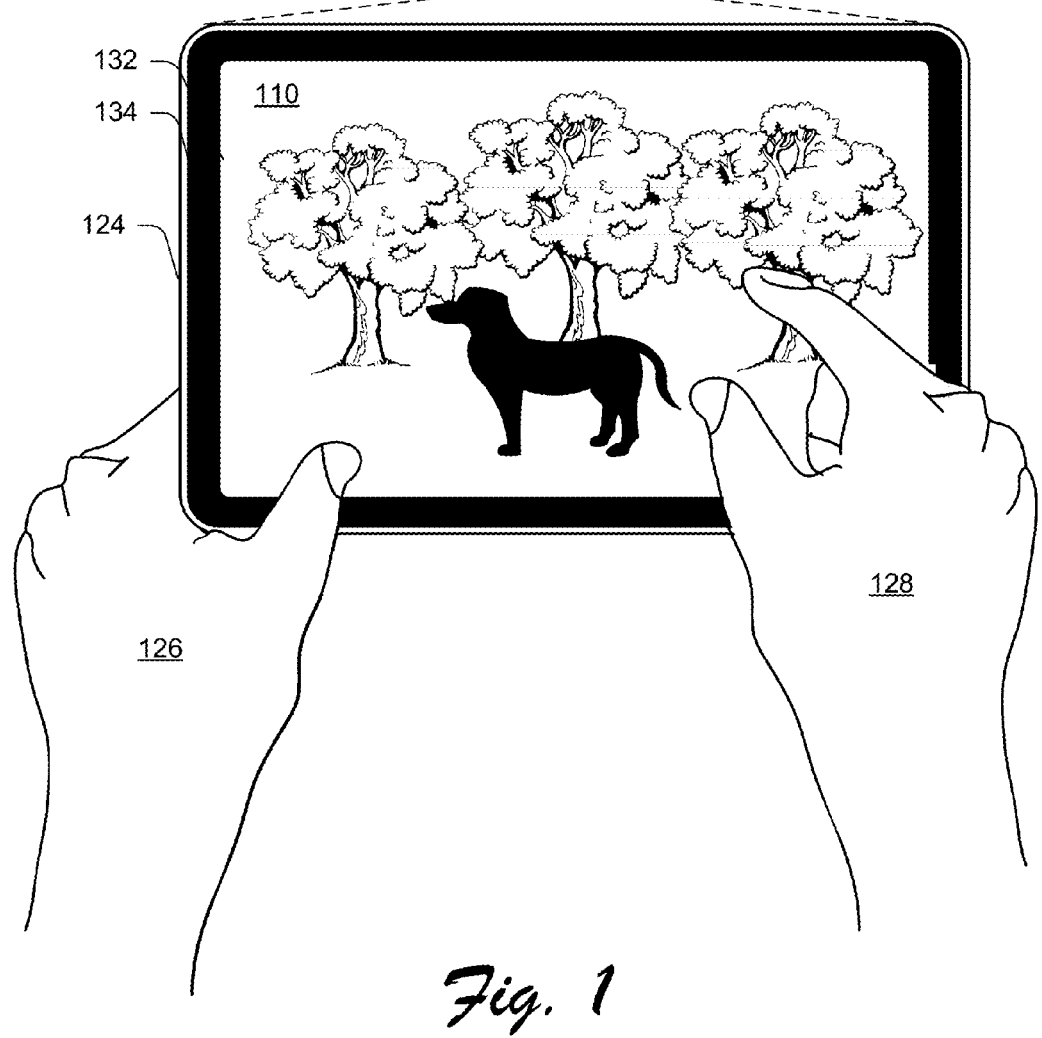

FIG. 1 is an illustration of an environment 100 in an example implementation that is operable to employ the conductive trace routing and bezel sensor techniques described herein. The illustrated environment 100 includes a computing device 102. In this example, the computing device 102 includes one or more computing components 104 that are implemented at least partially in hardware and are configured to perform and/or assist in performance of one or more operations of the computing device 102, e.g., in execution of instructions specified by software. Examples of computing components 104 include a processing system 106, memory 108, a display device 110, object detection sensors 112 that include display and bezel sensors 114, 116 and an object detection module 118. Examples of software that are executable on the processing system 106 and are storable in memory 108 include an operating system 120 and applications 122.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, portable music or game device, remote control, and so forth.

Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as a remote control and set-top box combination, a game console and game controller configuration, include peripheral devices, dedicated touchpad, and so on.

For example, the computing device 102 is illustrated as including a housing 124, in which, the computing components 104 are disposed therein. The housing 124 is configured to support a handheld form factor such that the housing 124 may be held by a hand 126 of a user while supporting interaction with another hand 128 of the user, may be grasped by both hands 126, 128 of a user, and so on.

In the illustrated example, a finger of a user's hand 128 is illustrated as interacting with a user interface displayed in a display area 130 of the display device 110. This may be utilized to support a variety of different functionality, which may include interaction with user interface elements displayed on the display device 110, recognition of gestures, and so on that include processing of inputs by an object detection module 118 to determine a location, at which, the object is detected.

For instance, proximity of an object, e.g., the finger of the user's hand 128, may be detected by display sensors 114 that are disposed as proximal to the display area 132. The display sensors 114 may be configured in a variety of different ways to detect proximity of an object, such as capacitive sensors, resistive sensors, acoustic sensors, image capture devices (e.g., sensor-in-a-pixel), and so forth such that the display sensors 114 do not obstruct a view by a user of the user interface in the display area 132 in this instance. A variety of other objects may also be detected, such as a stylus, and so on. Thus, in this example the display sensors 114 and the display device 110 are configured to form a touch panel to support touchscreen functionality.

The computing device 102 also includes bezel sensors 116 that are disposed in a bezel 134 that at least partially surrounds the display area 132 of the display device 110. The bezel 134 and corresponding bezel sensors 116 may be included as part of the touch panel described earlier. The bezel 134, however, may be configured such that a user interface is not displayable through the bezel 134, which is illustrated in black in the figure. Other examples are also contemplated in which the bezel 134 may be utilized to display parts of a user interface, e.g., to indicate a position of a user's hand, include user interface elements, notifications, and so on.

The bezel sensors 116 of the bezel 134 may also be configured to detect proximity of an object, such as parts of a user's hand 128 as illustrated that are disposed over the bezel sensors 116. Like the display sensors 114, the bezel sensors 116 may be configured in a variety of ways, such as capacitive sensors, resistive sensors, acoustic sensors, image capture devices (e.g., sensor-in-a-pixel), thermal sensors, strain sensors, and so on.

Inputs from the bezel sensors 116 may also be processed by the object detection module 118 to determine a location at which the object is detected as proximal to the bezel 132. For example, the object detection module 118 may include a single controller implemented in hardware that is configured to process inputs received from the bezel sensors 116. In one or more implementations, this single controller of the object detection module 118 may also be configured to process inputs received from the display sensors 114, which may be utilized to reduce overall cost and improve efficiency of the computing device 102.

Other multi-controller examples are also contemplated, such as to reduce power consumption as further described below by keeping the bezel sensors 116 "active" while other computing components 104 are in a sleep state to initiate a "wake" of those components. The inputs from the bezel sensors 116 may be processed singly or in combination with inputs received from the display sensors 114 as further described below.

A variety of different types of gestures may be recognized by the object detection module 118, such a gestures that are recognized from a single type of input as well as gestures involving multiple types of inputs. For example, the computing device 102 may be configured to detect and differentiate between proximity to the display sensors 114 of the display device 110 from one or more bezel sensors 116 utilized to detect proximity of an object at a bezel 134 of the display device 110. The differentiation may be performed in a variety of ways, such as by detecting a location at which the object is positioned, use of different sensors, and so on.

Thus, the object detection module 118 may support a variety of different gesture techniques by recognizing and leveraging a division between inputs received via a display portion 132 of the display device 110 and the bezel 134. Consequently, the combination of display and bezel inputs may serve as a basis to indicate a variety of different gestures.

For instance, primitives of touch (e.g., tap, hold, two-finger hold, grab, cross, pinch, hand or finger postures, and so on) may be composed to create a space of intuitive and semantically rich gestures that are dependent on "where" these inputs are detected as well as which sensors were utilized in this detection. It should be noted that by differentiating between display and bezel inputs, the number of gestures that are made possible by each of these inputs alone is also increased. For example, although the movements may be the same, different gestures (or different parameters to analogous commands) may be indicated using inputs detected via the display 132 versus a bezel 134.

Although the following discussion may describe specific examples of inputs, in instances the types of inputs may be switched (e.g., display may be used to replace bezel inputs and vice versa) and even removed (e.g., both inputs may be provided using either portion) without departing from the spirit and scope of the discussion.

Figure 2:
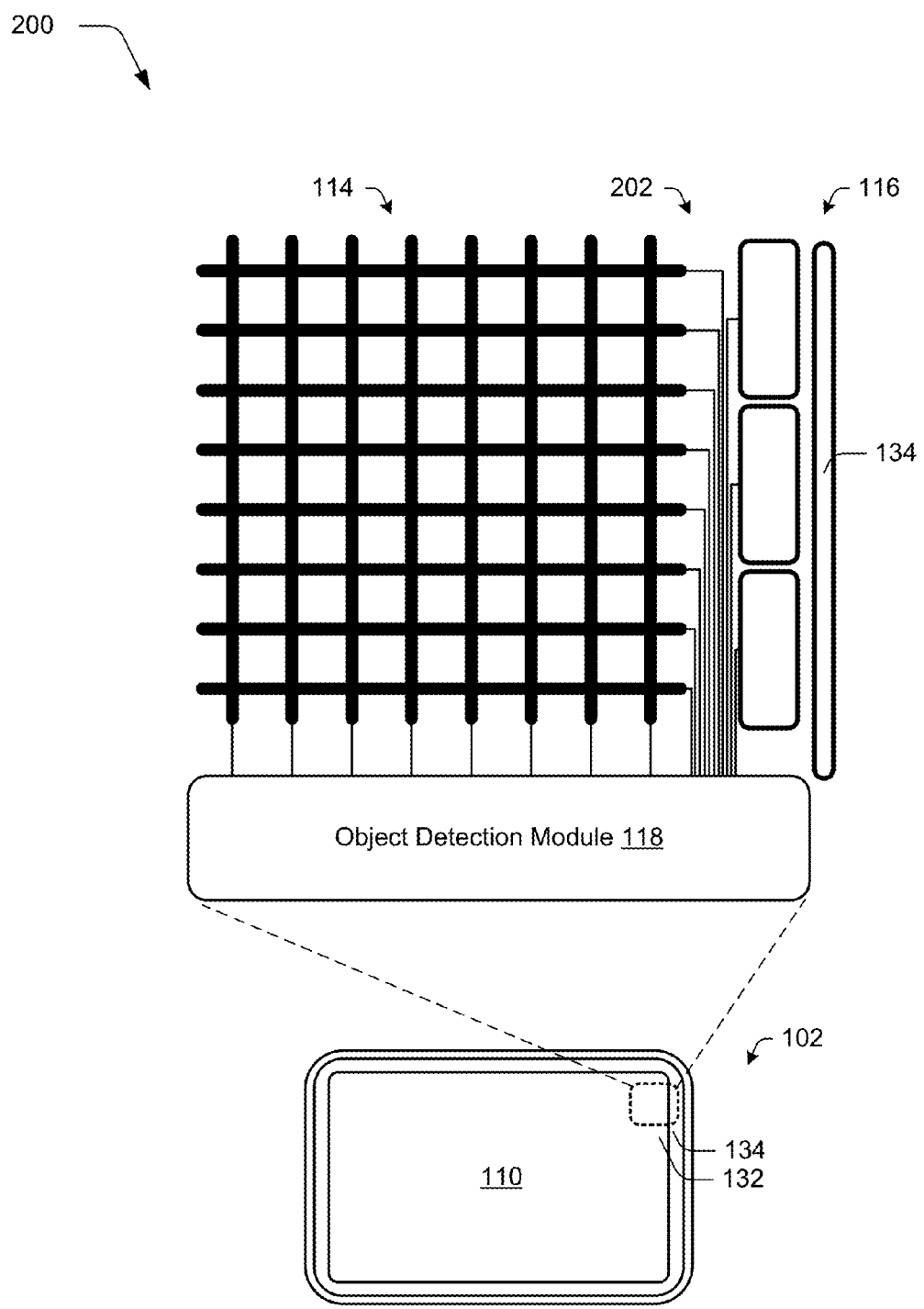
FIG. 2 depicts a system showing an example of a communicative coupling of the display and bezel sensors to the object detection module using a plurality of conductive traces.

FIG. 2 depicts a system 200 showing an example of a communicative coupling of the display and bezel sensors to the object detection module 118. In this example, a section of a touch panel is shown in greater detail as including the display sensors 114 and the bezel sensors 116 from the display portion 132 and bezel of the display device 110, respectively. The display and bezel sensors 114, 116 may be configured as previously described to include matching techniques to detect proximity of an object, e.g., such that the display sensors 114 "extend into" the bezel 134 to support use as bezel sensors 116.

The display sensors 114 may also be configured to detect proximity of an object in manner that is different than that used by the bezel sensors 116, e.g., different types, patterns, and so on. In the illustration, for instance, the display sensors 114 may be configured as a grid (e.g., using indium tin oxide or "ITO") that is configured to detect proximity of an object at a variety of different locations using mutual capacitance. Mutual capacitance occurs between charge-holding objects such that current passes between the objects. For example, lines of the grid of the display sensors 114 may act as capacitor plates with a material disposed between the lines acting as a dielectric of a capacitor.

The bezel sensors 116, however, may be configured to support direct capacitance that is discrete for individual ones of the bezel sensors 116. Thus, in this example individual sensors of the bezel sensors 116 may be utilized to detect proximity of an object to the respective sensors. Detection by the bezel sensors 116 using direct capacitance may support a greater range of detection than that supported using mutual capacitance by the display sensors. This may be utilized to support a variety of different functionality, such as to detect proximity of an object as it approaches but does not contact a surface that includes the bezel sensors 116, further discussion of which may be found in relation to a discussion of FIG. 4.

The display sensors 114 and the bezel sensors 116 are illustrated as being communicatively coupled to the object detection module 118 using a plurality of conductive traces 202. By routing the conductive traces 202 between the display and bezel sensors 114, 116, the bezel sensors 114 may be positioned adjacent to an edge of the housing 134, as opposed to routing of the traces between the sensors and the housing as was conventionally performed. In this way, the bezel sensors 116 may be positioned relatively close to the edge of the housing 134 (e.g., within one millimeter) that was not feasible using conventional techniques. The "to the edge" location of the bezel sensors 116 along with the display sensors 114 may thus support an extended detection area that may be leveraged to support a variety of different functionality, further discussion of which may be found below and shown in an corresponding figure.

Figure 3:
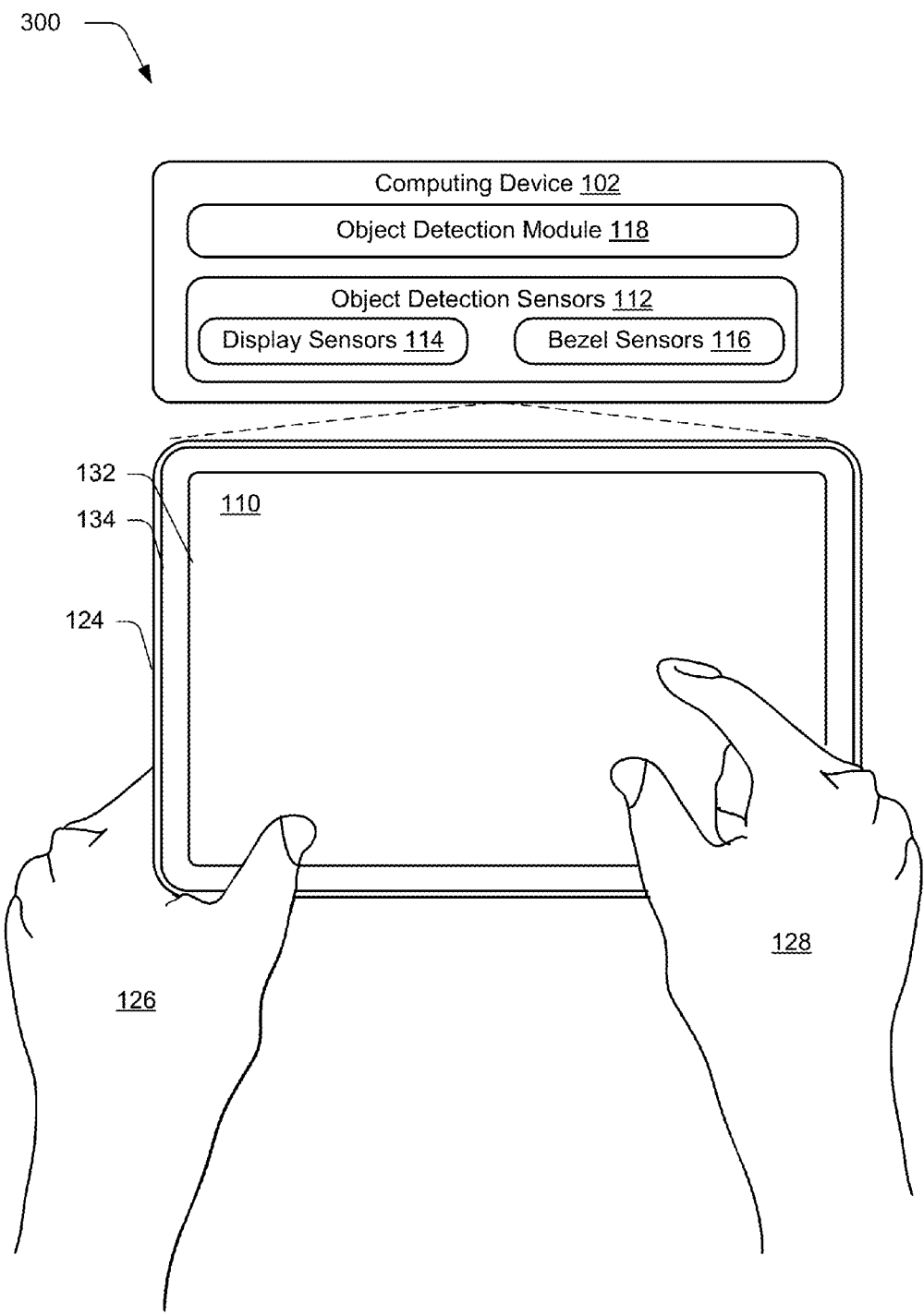
FIG. 3 depicts an example implementation in which an object detection module is configured to distinguish and leverage inputs provided by display and bezel sensors to support interaction with the computing device of FIG. 1.

FIG. 3 depicts an example implementation 300 in which the object detection module 118 is configured to distinguish between and leverage inputs provided by the display and bezel sensors 114, 116 to support interaction with the computing device 102. The object detection module 118 may leverage the bezel sensors 116 along with the display sensors 114 to make a determination as to how interaction with the computing device 102 is performed.

In the illustrated example, for instance, inputs from the bezel and display sensors 114, 116 may be processed by the object detection module 118 to make a determination that the housing 124 of the computing device 102 is likely held in the user's left hand 126. Additionally, inputs from the bezel and display sensors 114, 116 may also be processed to indicate that a fingertip of a user's hand 128 is detected by the display sensors 114 along with flat fingers and a palm of that user's right hand 128 by the display and bezel sensors 114, 116.

Thus, in this example the determination may cause inputs to be ignored that correspond to the left hand 126. A determination may also be made to permit inputs that correspond to a fingertip of the user's right hand 128 but reject inputs from the palm and flat finger surfaces of that hand. Although this example describes restriction of inputs that are not likely related to a gesture, a variety of other examples are also contemplated, such as to orient a user interface based on how the computing device 102 is likely held, cause output of user interface elements at positions based on "where" the computing device is likely held, to manage wireless devices in accordance with specific absorption rate (SAR) considerations, and so forth as further described below.

A determination of which inputs to leverage (e.g., for recognition of a gesture, orientation of a user interface, and so on) may be made in a variety of ways. For example, a plurality of samples may be collected that involve different usage scenarios. These samples may then be processed using machine learning or other techniques to generate data that describes likely hand positions, orientations, and so on for inputs received from the sensors. Accuracy of a likely determination may be improved based on resolution of the inputs, e.g., the more bezel sensors 116 utilized in the bezel 134 the greater the likelihood of an accurate determination using inputs from these sensors.

Further, inputs from additional sensors may be leveraged to improve this determination, such as from sensors disposed on the sides and/or back of the housing 124. In the illustrated example, for instance, sensors may be disposed on the sides of the housing 124 that are generally perpendicular to a plane of a surface of the display device 110 (e.g., at an angle of twenty-two degrees from a perpendicular plane to that of the display device), the back of the housing 124 that is defined as a plane generally perpendicular to the plane of the surface of the display device 110 (e.g., on an opposing side), and so on. Other examples of use of inputs received from the display and bezel sensors 114, 116 are also contemplated as further described below.

Figure 4:
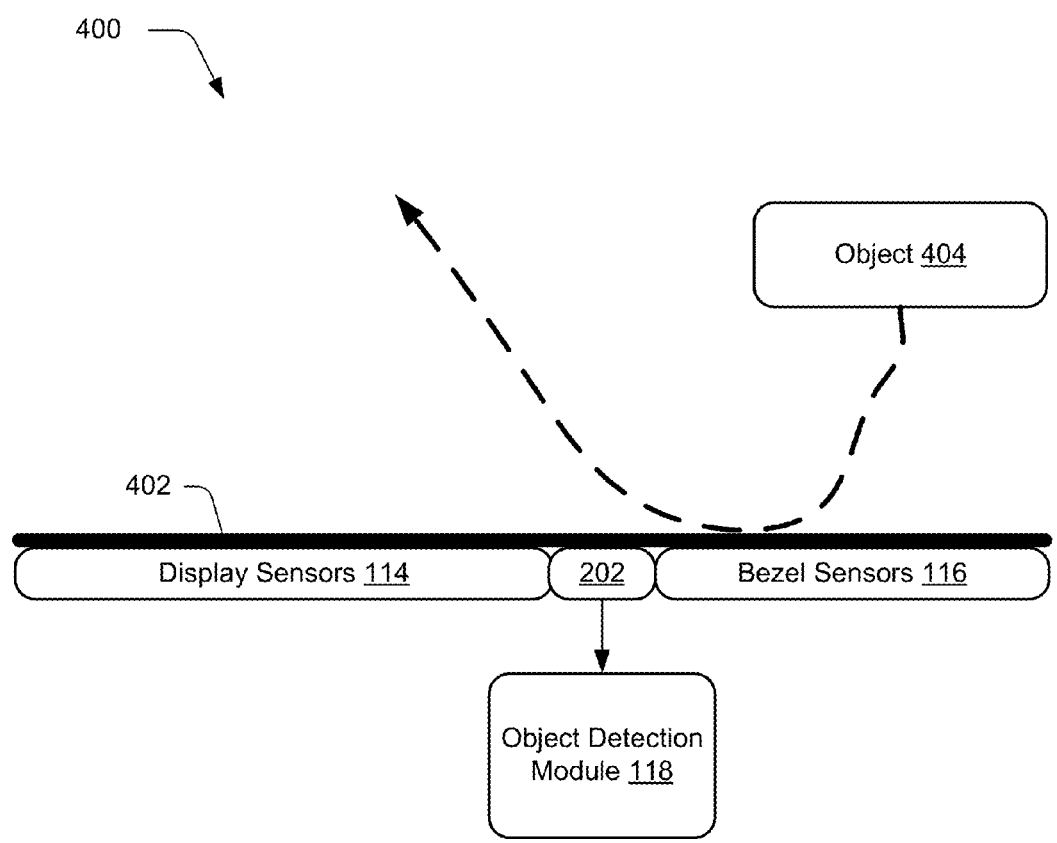
FIG. 4 depicts an example system showing a cut-away view of the display and bezel sensors along with the plurality of conductive traces in a coplanar relationship.

FIG. 4 depicts an example system 400 showing a cutaway view of the display and bezel sensors along with the plurality of conductive traces 202 in a co-planar relationship. In this example, the display and bezel sensors 114, 116 are formed along with the plurality of conductive traces 202 in a co-planar relationship on a substrate 402, e.g., glass, plastic, and so on.

A grid of ITO, for instance, may be utilized to form the display sensors 114 as shown in FIG. 2. Discrete sensing elements may also be formed from the ITO for the bezel sensors 116 on the substrate 402 along with the plurality of conductive traces 202. The conductive traces 202 may be formed in a channel between the display and bezel sensors 114, 116 such that these traces are also coplanar, one to another, and are formed without using "jumpers." In this way, overall thinness of the computing device 102 may be promoted by avoiding use of additional layers, thereby preserving a handheld form factor of the computing device 102.

As previously described the bezel sensors 116 may be configured to support an increased sensing range in comparison with the display sensors 114 in one or more implementations. This increased sensing range may be utilized in a variety of ways, such as to detect an object 404 such as a palm of a user's hand and thereby reject inputs that correspond to detection of that object before contact with a surface of the computing device 102 and/or detection by the display sensors 114.

Additionally, the machine learning techniques may also be employed to manage computing device 102 operation based on detection of the object 404, which may include movement of the object in relation to the object detection sensors 112. For example, the bezel sensors 116 may be configured to consume less power than the display sensors 114. As such, the bezel sensors 116 may operate in a polling fashion by "waking" at periodic intervals to determine if an object 404 is proximal while other component components 104 are in a sleep state. If so, this detection by the object detection module 118 may then cause other computing components 104 that are in the sleep state (e.g., hibernation state) to "wake" to support user interaction. Movement of the object 404 may also assist on this determination, such as toward or away from the bezel sensors 116 as illustrated by the phantom line in the figure.

Thus, in this example, the object detections sensors 112 may be utilized to determine a likely location of the object 404 as well as orientation of the computing device 102 itself in relation to the object 404. This may also be leveraged as part of specific absorption rate (SAR) management of computing components 104 of the computing device 102 that emit radiation, e.g., wireless communication components. For instance, the object detection module 118 may indicate that an object 404 is disposed proximal to the computing device 102, antennas of the computing device 102, and so on. This indication may then be leveraged by the computing device 102 (e.g., operating system 120, applications 122, and so on) to reduce an amount of radiation emitted by a Wi-Fi® network connection device, Bluetooth® wireless connection device, and so on. Further, this indication may be leveraged with the indication of movement to support further functionality, e.g., permit higher emissions as the object 404 is moved away as opposed to when the object 404 is moved toward the sensors, and so forth. Although a coplanar relationship was described in this example 400, non-coplanar relationships between the display sensors 114, bezel sensors 116, and plurality of conductive traces 202 are also contemplated without departing from the spirit and scope thereof, an example of which is described as follows and shown in a corresponding figure.

Figure 5:
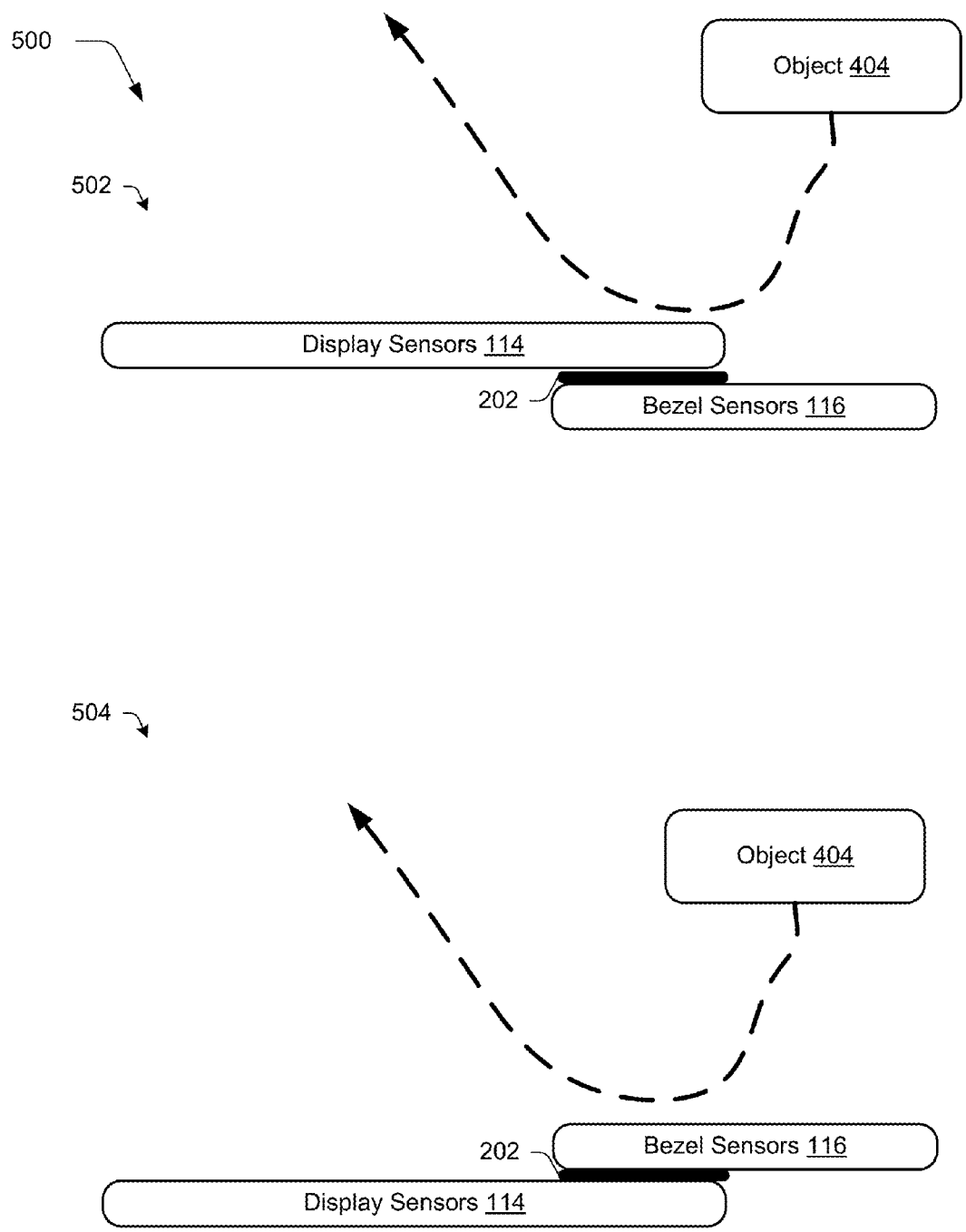
FIG. 5 depicts an implementation showing first and second examples of arrangements of the display sensors, bezel sensors, and plurality of conductive traces in relation to each other.

FIG. 5 depicts an implementation 500 showing first and second examples 502, 502 or arrangements of the display sensors 114, bezel sensors 116, and plurality of conductive traces 202 in relation to each other. In the first example 502, an overlapping arrangement of the display sensors 114 and the bezel sensors 116 is shown in which the plurality of conductive traces 202 are also disposed between these sensors. In this example, the display sensors 114 are disposed on a plane that is closer to an object 404 to be detected than a plane that includes the bezel sensors 116.

The second example 504 also includes an overlapping arrangement, but in this instance the bezel sensors 116 are disposed on a plane that is closer to an object 404 to be detected than a plane that includes the display sensors 114. A variety of other examples of arrangements are also contemplated as further described in relation to the following procedures.

Example Procedures

The following discussion describes bezel sensor and conductive trace routing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
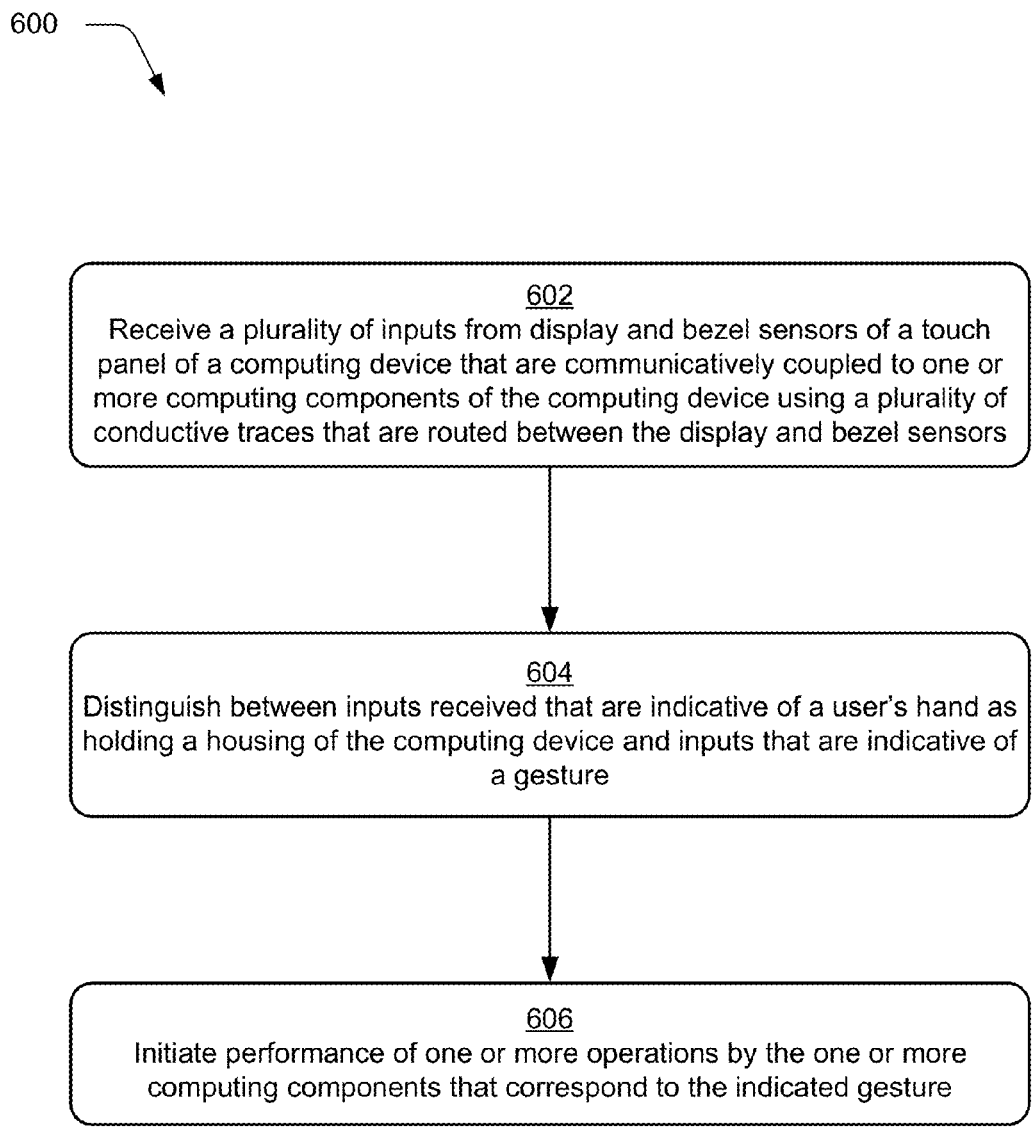
FIG. 6 is a flow diagram depicting a procedure in an example implementation in which inputs are distinguished based on a likelihood of being indicative of a user's hand as holding a housing of a computing device and inputs that are likely indicative of a gesture.

FIG. 6 depicts a procedure 600 in an example implementation in which inputs are distinguished based on a likelihood of being indicative of a user's hand as holding a housing of a computing device and inputs that are likely indicative of a gesture. A plurality of inputs are received from display and bezel sensors of a touch panel of a computing device that are communicatively coupled to one or more computing components of the computing device using a plurality of conductive traces that are routed between the display and bezel sensors (block 602). As shown in FIGS. 4 and 5, for instance, the conductive traces 202 may be routed between the display and bezel sensors 114, 116 in a coplanar relationship, multi-planar relationship, and so on. In this way, the bezel sensors 116 may be positioned closer to an edge of the housing 124 than would otherwise be possible if the traces were routed along the "outside" of the sensors.

Inputs are distinguished between inputs received that are indicative of a user's hand as holding a housing of the computing device and inputs that are indicative of a gesture (block 604). Data generated from machine learning, for instance, may be leveraged by an object detection module 118 to determine a likelihood that inputs correspond to gestures versus those cause by a user holding the device and thus are not desired on the part of a user to initiate an operation of the device. Performance of one or more operations is then initiated by the one or more computing components that correspond to the indicated gesture (block 606), such as to navigate through a user interface, select particular items, and so on.

Example System and Device

Figure 7:
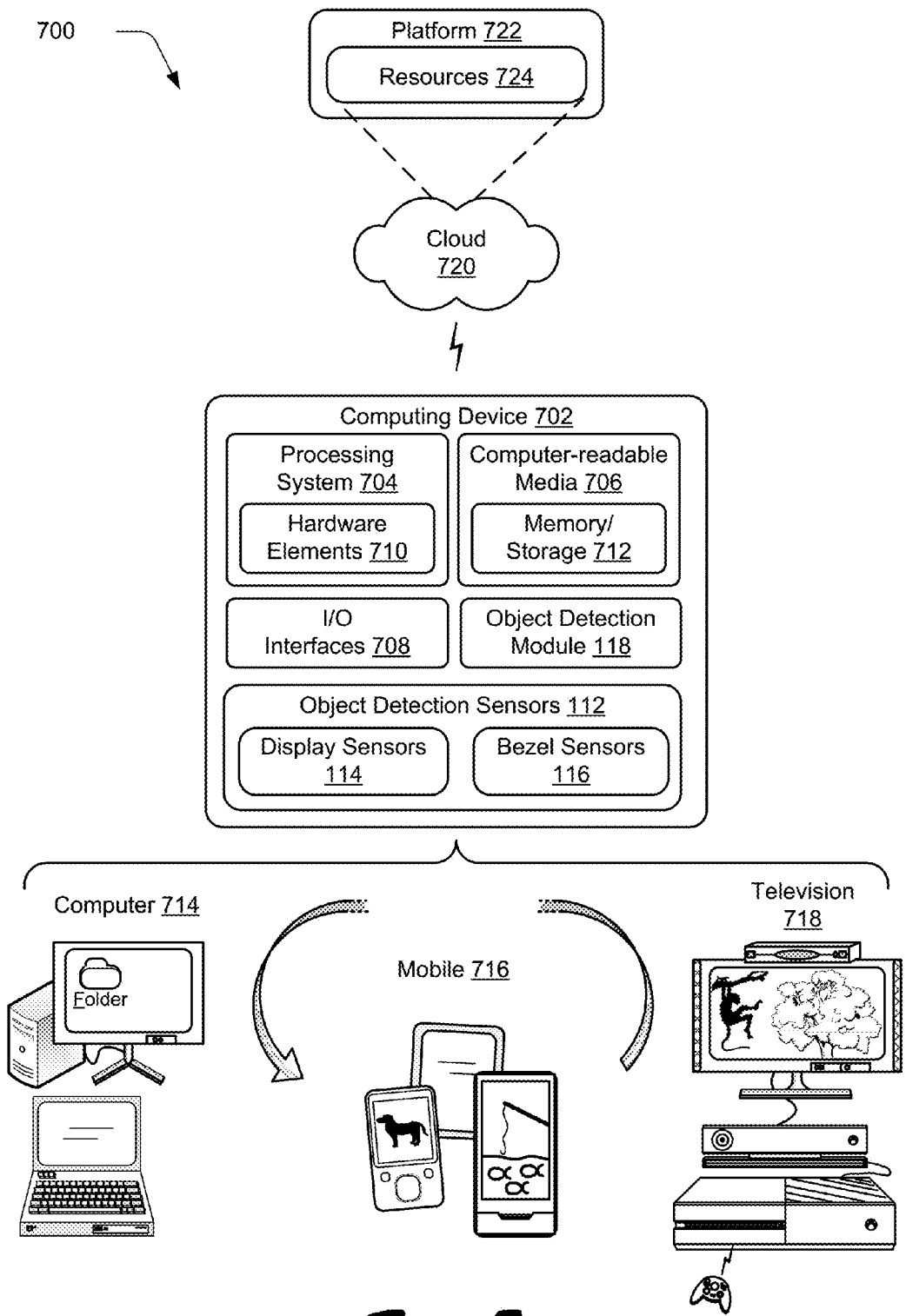
FIG. 7 illustrates various components of an example device that can be implemented as any type of portable and/or computer device as described with reference to FIGS. 1-6 to implement embodiments of the conductive trace routing and bezel sensor techniques described herein.

FIG. 7 illustrates an example system generally at 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system that includes computing components 104 as described above.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system comprising:
a display panel including:
display sensors disposed in a display area of the display panel and configured to detect proximity of objects relative to a surface of the display panel; and
bezel sensors disposed in a bezel of the display panel that are also configured to detect proximity of the objects relative to a surface of the display panel;
one or more computing components configured to process inputs received from the display sensors and the bezel sensors to identify gestures; and
a plurality of conductive traces, routed between the display sensors and the bezel sensors, the conductive traces communicatively coupling the display sensors and the bezel sensors to the one or more computing components.

2. A system as described in claim 1, wherein the display sensors are configured to perform detection of the object using a different sensing technology than the bezel sensors.

3. A system apparatus as described in claim 2, wherein the display sensors are configured to detect the proximity of the objects using mutual capacitance and the bezel sensors are configured to detect the proximity of the objects using direct capacitance.

4. A system as described in claim 1, wherein the display sensors, the bezel sensors, and the plurality of conductive traces are at least partially coplanar.

5. A system as described in claim 1, wherein the plurality of conductive traces is routed in a channel between the display sensors and the bezel sensors.

6. A system as described in claim 1, wherein the bezel sensors have a detection range that is different than a detection range for the display sensors.

7. A system as described in claim 6, wherein the detection range of the bezel sensors is greater than the detection range for the display sensors.

8. A system as described in claim 1, wherein the one or more computing components include an object detection module.

9. A system as described in claim 8, wherein the object detection module is configured to recognize a gesture from the inputs received from one or more of the display sensors or the bezel sensors and initiate actions corresponding to the gesture.

10. A system as described in claim 1, wherein the one or more computing components include a component to manage radiation emission for specific absorption rate (SAR) management responsive to the inputs received from one or more of the display sensors or the bezel sensors indicating proximity of a user to the system.

11. A system as described in claim 1, wherein the display sensors, plurality of conductive traces, and bezel sensors are formed on a surface of a single substrate.

12. A tablet computing device comprising:
   display sensors disposed in a display area of the tablet computing device configured to detect proximity of objects relative to a surface of a display panel;
   bezel sensors disposed in a bezel of the tablet computing device that are also configured to detect proximity of the objects relative to the surface of the display panel, the display sensors configured to perform detection of the objects using a different sensing technology than the bezel sensors; and
   a plurality of conductive traces, routed in a channel between the display sensors and the bezel sensors, the conductive traces communicatively coupling the display sensors and the bezel sensors to an object detection component configured to process inputs received via the display sensors and the bezel sensors, the object detection component further configured to analyze the inputs received from the display sensors and the bezel sensors to identify gestures.

13. A tablet computing device as described in claim 12, wherein the display sensors, the bezel sensors, and the plurality of conductive traces are at least partially coplanar.

14. A tablet computing device as described in claim 12, wherein the bezel sensors have a detection range that is different than a detection range for the display sensors.

15. A tablet computing device as described in claim 12, wherein the display sensors are configured to detect the proximity of the objects using mutual capacitance and the bezel sensors are configured to detect the proximity of the objects using direct capacitance.

16. A computing device comprising:
   a touch panel having display sensors configured to detect proximity of an object, and bezel sensors disposed in a bezel of the touch panel also configured to detect proximity of the object, the bezel sensors disposed along one or more sides of the computing device within a distance of one millimeter to the edge of a housing of the computing device and the bezel sensors having a detection range that is different than a detection range for the display sensors; and
   a plurality of conductive traces, routed between the display sensors and the bezel sensors, that communicatively couple the display sensors and the bezel sensors to one or more computing components configured to analyze inputs received from the display sensors and the bezel sensors.

17. A computing device as described in claim 16, wherein the display sensors are configured to perform detection of the object using a different sensing technology than the bezel sensors.

18. A computing device as described in claim 17, wherein the one or more computing components include an object detection module configured to recognize a gesture from the inputs received from one or more of the display sensors or the bezel sensors and initiate actions corresponding to the gesture.

19. A tablet computing device as described in claim 17, wherein the plurality of conductive traces are routed in a channel between the display sensors and the bezel sensors.

20. A computing device as described in claim 16, wherein the one or more computing components include an object detection module configured to recognize a gesture from the inputs received from one or more of the display sensors or the bezel sensors and initiate at least one action corresponding to the gesture.

* * * * *